(12) United States Patent
Zhang et al.

(10) Patent No.: US 12,010,180 B2
(45) Date of Patent: Jun. 11, 2024

(54) METHOD AND DEVICE FOR RESOURCE GUIDING, APPARATUS AND STORAGE MEDIUM

(71) Applicant: BOE TECHNOLOGY GROUP CO., LTD., Beijing (CN)

(72) Inventors: Qian Zhang, Beijing (CN); Junjie Zhao, Beijing (CN); Yanqiu Zhao, Beijing (CN); Jing Su, Beijing (CN); Xinan Wang, Beijing (CN); Shaobei Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/010,506

(22) PCT Filed: Jun. 15, 2021

(86) PCT No.: PCT/CN2021/100060
§ 371 (c)(1),
(2) Date: Dec. 15, 2022

(87) PCT Pub. No.: WO2021/259089
PCT Pub. Date: Dec. 30, 2021

(65) Prior Publication Data
US 2023/0300198 A1 Sep. 21, 2023

(30) Foreign Application Priority Data
Jun. 22, 2020 (CN) .......................... 202010576749.6

(51) Int. Cl.
*H04L 67/125* (2022.01)

(52) U.S. Cl.
CPC ................................. *H04L 67/125* (2013.01)

(58) Field of Classification Search
CPC ..... H04L 67/1031; H04L 67/12; H04L 67/51; G06F 9/5077; G06F 9/4843; G06F 9/45558; G06F 9/5005
See application file for complete search history.

(56) References Cited

U.S. PATENT DOCUMENTS

| | | | | |
|---|---|---|---|---|
| 2016/0359797 | A1* | 12/2016 | Bhalla | ................... H04L 61/106 |
| 2017/0238122 | A1* | 8/2017 | Yang | ..................... H04L 61/106 370/310 |
| 2017/0238273 | A1* | 8/2017 | Yang | ..................... H04W 4/70 455/435.1 |
| 2020/0326989 | A1* | 10/2020 | Li | ....................... H04L 67/1031 |

(Continued)

*Primary Examiner* — Mahran Y Abu Roumi
(74) *Attorney, Agent, or Firm* — HOUTTEMAN LAW LLC

(57) ABSTRACT

The present application provides a method for resource guiding, a device for resource guiding, an apparatus and a computer storage medium, the method includes: acquiring, by a first receiver, a target request sent by a first requester, the target request carries resource information and a target address, the target address includes a virtual resource address, and the resource information includes recommendation information; and acquiring, by the first receiver, the recommendation information according to the virtual resource address, and determining an action executor according to the virtual resource address, the recommendation information is used for recommending a next action to be executed for the action executor.

12 Claims, 12 Drawing Sheets

(56) References Cited

U.S. PATENT DOCUMENTS

| | | | |
|---|---|---|---|
| 2021/0037093 A1* | 2/2021 | Yin | H04L 67/1095 |
| 2021/0306831 A1* | 9/2021 | Seed | H04L 41/5041 |
| 2022/0124008 A1* | 4/2022 | Chen | H04L 41/0894 |

* cited by examiner

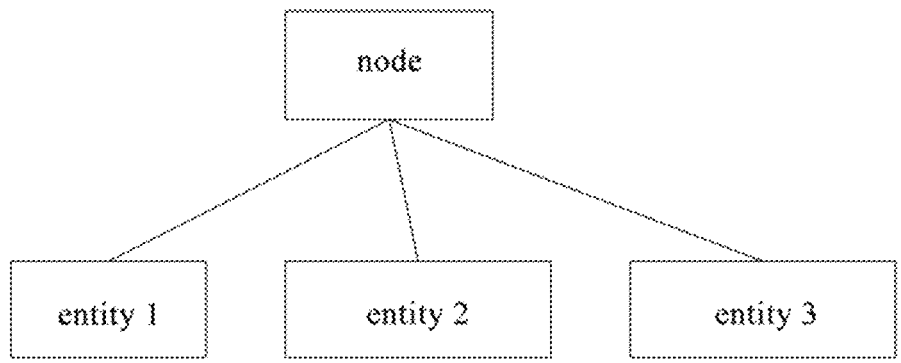
FIG. 1
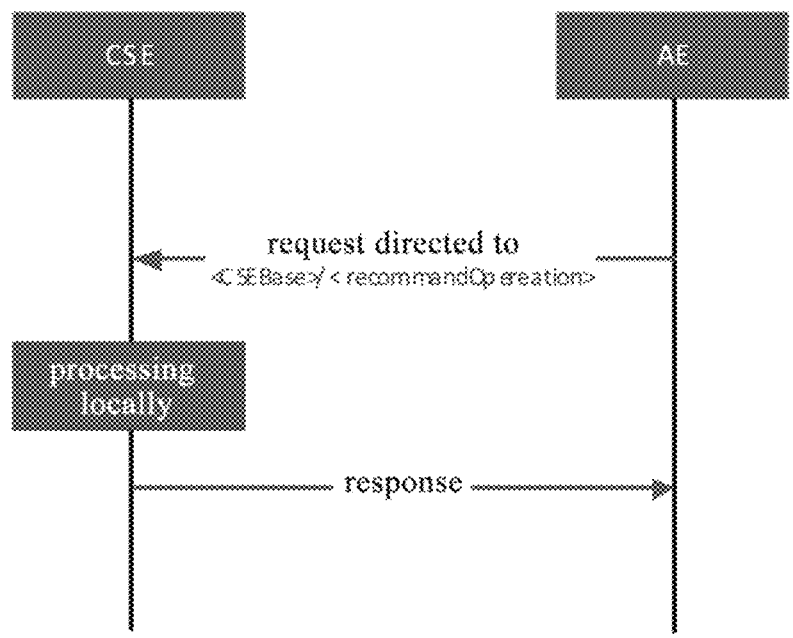
FIG. 2
FIG. 3

METHOD AND DEVICE FOR RESOURCE GUIDING, APPARATUS AND STORAGE MEDIUM

CROSS-REFERENCE TO RELATED APPLICATIONS

The present application claims the priority to Chinese patent application No. 202010576749.6, filed on Jun. 22, 2020, the contents of which are incorporated herein by reference in their entirety.

TECHNICAL FIELD

The present application relates to the field of computer technology, and in particular, to a method for resource guiding, a device for resource guiding, an apparatus and a storage medium.

BACKGROUND

In one M2M protocol framework, four types of nodes, including Application Dedicated Node (ADN), Application Service Node (ASN), Middle Node (MN), and Infrastructure Node (IN), are defined. As shown in FIG. 1, each node is composed of one or more entities, and there are three types of entities including Application Entity (AE), Common Service Entity (CSE), and Network Service Entity (NSE). The AE uses services provided by the CSE and registers with the CSE, and rules for registering are as follows: one AE registers with at most one CSE (e.g., ASN-CSE, MN-CSE, or IN-CSE); one ASN-CSE registers with at most one other type of CSE (e.g., MN-CSE or IN-CSE); one MN-CSE registers with at most one other CSE (e.g., ASN-CSE or IN-CSE).

Two entities interact, for example, an entity A sends a request to an entity B, and the entity A may receive a response indicating that the request failed. In such case, the entity A will adjust parameters and continue to send the request to the entity B, and if the entity A receives a response indicating that the request failed again, the entity A will continue to adjust the parameters and send the request to the entity B again.

As above, the interaction between the two entities in the above mode has relatively low efficiency and relatively long time delay.

SUMMARY

In a first aspect, an embodiment of the present application provides a method for resource guiding, including:
  acquiring, by a first receiver, a target request sent by a first requester, the target request carrying resource information and a target address, the target address including a virtual resource address, and the resource information including recommendation information; and
  acquiring, by the first receiver, the recommendation information according to the virtual resource address, and determining an action executor according to the virtual resource address, the recommendation information being configured for recommending a next action to be executed for the action executor.

In a second aspect, an embodiment of the present application provides a device for resource guiding, applied to a first receiver, including:
  a receiving module configured to acquire a target request sent by a first requester, the target request carrying resource information and a target address, the target address including a virtual resource address, and the resource information including recommendation information; and
  a determining module configured to acquire the recommendation information according to the virtual resource address and determine an action executor according to the virtual resource address, the recommendation information being configured for recommending a next action to be executed for the action executor.

In a third aspect, an embodiment of the present application provides an apparatus, including a processor and a memory;
  the processor executes a program corresponding to an executable program code stored in the memory by reading the executable program code, so as to implement the method for resource guiding according to the first aspect.

In a fourth aspect, an embodiment of the present application provides a non-transitory computer-readable storage medium stored with a computer program, the computer program, when executed by a processor, implements the method for resource guiding according to the first aspect.

Additional aspects and advantages of the present application will be set forth in part in the following description, and in part, will be obvious from the description, or may be learned from practice of the present application.

DRAWINGS

The above and/or additional aspects and advantages of the present application will become apparent and readily appreciated from the following description of embodiments, taken in conjunction with the accompanying drawings, in which:
  FIG. 1 is a schematic structural diagram of a node in one M2M protocol framework;
  FIG. 2 is a schematic flowchart of a method for resource guiding according to an embodiment of the present application;
  FIG. 3 is a schematic diagram of designating an action executor according to an embodiment of the present application;
  FIG. 4 is a schematic diagram of designating an action executor according to an embodiment of the present application;
  FIG. 5 is a schematic diagram of designating an action executor according to an embodiment of the present application;
  FIG. 6 is a schematic flowchart of a method for resource guiding according to an embodiment of the present application;
  FIG. 7 is a schematic flowchart of a method for resource guiding according to an embodiment of the present application;
  FIG. 8 is a schematic diagram illustrating a variation during inviting a vehicle to join a group according to an embodiment of the present application;
  FIG. 9 is a schematic process diagram of inviting a vehicle to join a group according to an embodiment of the present application;
  FIG. 10 is a schematic flowchart of a method for resource guiding according to an embodiment of the present application;
  FIG. 11 is a schematic diagram illustrating groups of control motors for curtains according to an embodiment of the present disclosure;

DETAILED DESCRIPTION

Figure 4:
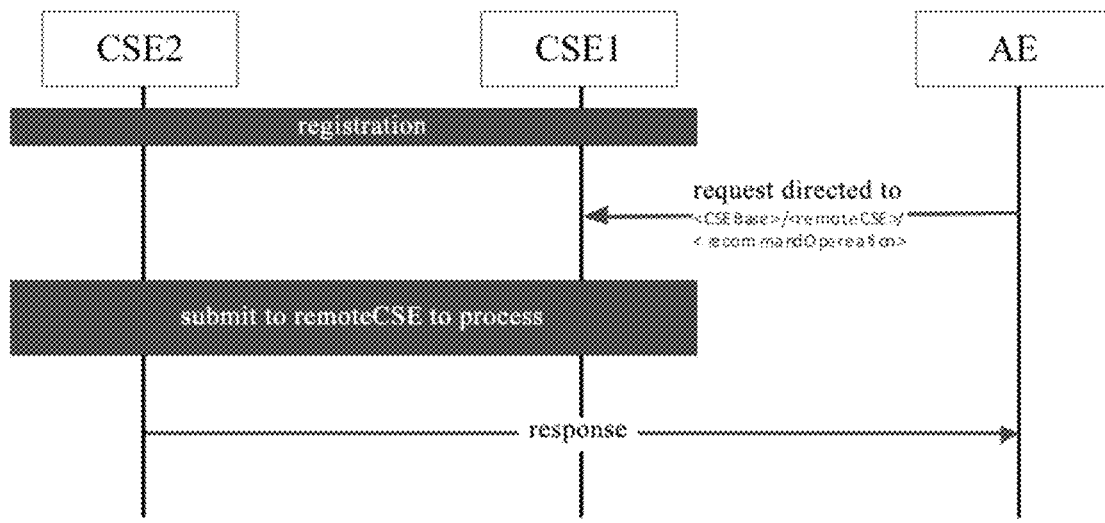

Embodiments of the present application are described in detail below. Examples of the embodiments are shown in the drawings, in which the same or similar signs throughout represent the same or similar elements or elements with the same or similar functions. The embodiments described below with reference to the accompanying drawings are exemplary and are intended to explain the present application and cannot be understood as limitations to the present application.

A method for resource guiding, an apparatus, and a storage medium in the embodiments of the present application are described below with reference to the accompanying drawings.

At least in view of the problems of low efficiency and long time delay in interaction of the entities in the related art, an embodiment of the present application provides a method for resource guiding.

According to the method for resource guiding, a virtual resource address is set, an action executor is determined according to the virtual resource address, and a next action to be executed is recommended to the action executor according to recommendation information, so that the resource is guided through the virtual resource address, the interaction efficiency and interaction intelligence are improved, and the time delay is reduced.

The method for resource guiding in the embodiment of the present application may be applied to a receiver, referred to as a first receiver for convenience of description, and the first receiver may be an entity apparatus, such as an air conditioning device, a gas monitoring device, an air monitoring and purifying device, or an electronic device installed with an application program, such as a mobile phone, a tablet computer, or the like.

FIG. 2 is a schematic flowchart of a method for resource guiding according to an embodiment of the present application.

As shown in FIG. 2, the method for resource guiding includes the following steps 101 and 102.

In the step 101, the first receiver acquires a target request sent by a first requester, the target request carries resource information and a target address, the target address includes a virtual resource address, and the resource information includes recommendation information.

In the embodiment, a request sent from the first requester to the first receiver is referred to as the target request, the target request carries the resource information and the target address. The resource information includes the recommendation information which may be placed in a content of a message packet. The target address includes the virtual resource address, the virtual resource address may be used for indicating that the target request is a special request and is a request in which the resource information includes the recommendation information, and then the first receiver determines that the target address includes the virtual resource address by analyzing the target address, which indicates that the target request is the special request carrying the recommendation information. If the target address in the target request does not include the virtual resource address, it indicates that the received target request is a common request.

In particular implementations, the target request may be implemented as a create request, an update request, a retrieve request, a delete request, and the like. For example, a registration request may be implemented as the create request, a request for joining a group may be implemented as the update request, an information acquisition request, i.e., a request for acquiring information, may be implemented as the retrieve request, and the like.

For the virtual resource address, for example, the virtual resource address <recommandOperation> may be set, and the receiver receives a special request of the requester through the virtual resource address. If the target address does not include the virtual resource address, it indicates that the received target request is the common request.

In the step 102, the first receiver acquires the recommendation information according to the virtual resource address and determines an action executor according to the virtual resource address, the recommendation information is used for recommending a next action to be executed for the action executor.

In the embodiment, when the target address carried in the target request includes the virtual resource address, it indicates that the target request is the special request carrying the recommendation information, and then the first requester may acquire the recommendation information according to the virtual resource address and determine the action executor.

For example, the target address is <CSEBase>/<recommandOpereation>, the target address includes the virtual resource address <recommandeOperation>, and the action executor is determined to be CSE according to the target address; the target address being <CSEBase>/<AE>/<recommandOpereation> indicates that the action executor is AE under CSEBase; <CSEBase>/<remoteCSE>/<recommandOpereation> indicates that the action executor is remoteCSE which is a CSE associated with the CSE corresponding to the CSEBase.

It should be noted that multiple CSEs correspond to multiple CSEBases one to one, and there may be multiple AEs under each CSEBase. For example, if the CSEBase is an automobile gateway and each of sensors connected to the automobile gateway may be regarded as the AE, and thus there are multiple AEs (CSEs) under the automobile gateway (CSEBase).

Figure 5:
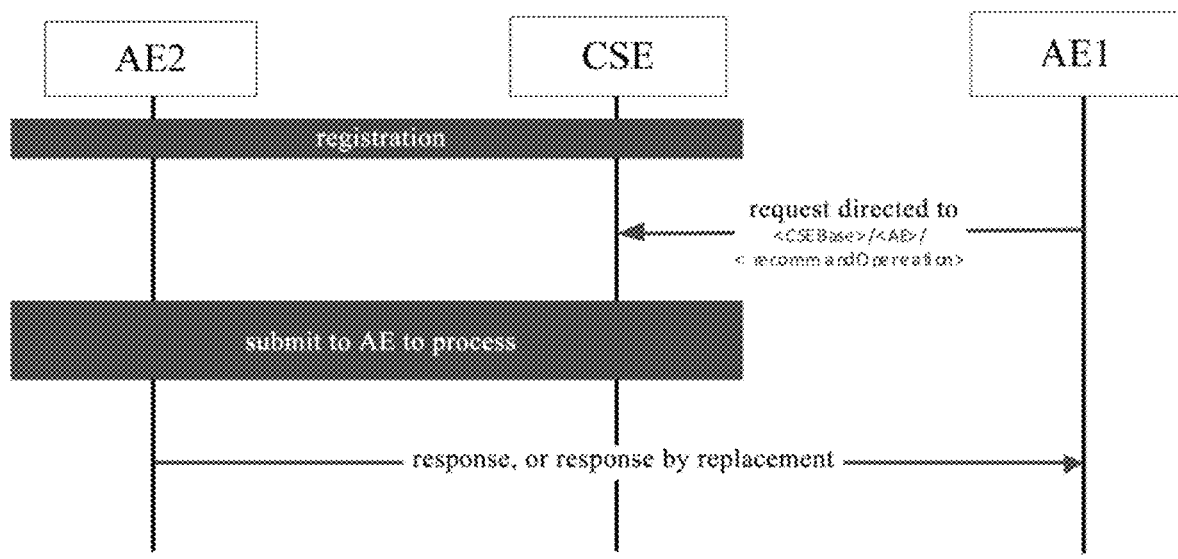

The following may describe the designation of the action executor with reference to FIG. 3 to FIG. 5, FIG. 3 is a schematic diagram of designating an action executor according to an embodiment of the present application; FIG. 4 is a schematic diagram of designating an action executor according to an embodiment of the present application;

FIG. 5 is a schematic diagram of designating an action executor according to an embodiment of the present application.

In FIG. 3, CSE is a first receiver and AE is a first requester.

AE sends a request to CSE corresponding thereto, the request is directed to <CSEBase>/<commandOperation>, and it is obvious that CSE is the action executor, and thus CSE processes the request locally and sends a response to AE, that is, CSE is the first receiver and is also the action executor.

In FIG. 4, CSE1 is a first receiver, AE is a first requester, CSE2 and CSE1 have already been registered, CSE2 is remoteCSE of CSE1, AE sends a request to CSE1 corresponding thereto, the request is directed to <CSEBase>/<remoteCSE>/<recammandOperation>, according to the virtual resource address, CSE1 submits the request to the remoteCSE to be processed, and the remoteCSE responds, that is, the remoteCSE is the action executor.

In FIG. 5, AE1 is the first requester, CSE is a first receiver, AE2 has been registered in CSE, AE1 sends a request to CSE corresponding thereto, and it is determined that the action executor is AE2 under the CSE according to the request directed to <CSEBase>/<AE>/<recammandOperation>, then the CSE submits the request to AE2 to be responded, or to replace the CSE to respond, and AE1 and AE2 may be regarded as two AEs under CSE.

In the embodiment, the recommendation information is used to recommend a next action to be executed to the action executor, that is, the first requester guides the recommendation information to the action executor through the virtual resource address, so that the action executor determines the next action, to be executed, recommended by the first requester according to the recommendation information.

For example, the recommendation information is information of a group, such as an identifier of the group, information of each member in the group, and the like, and the information of the group includes an identifier of the first receiver, and according to the recommendation information, it may be determined that the first requester recommends the first receiver to join the group.

As another example, if the recommendation information is a priority of an action, according to the recommendation information, it may be determined that the first receiver recommends the priority of the action to be set.

For another example, when an action resource is created, although the creation is successful, the CSE found it is futile to create relevant monitor and counter for such action resource, and the CSE may suggest the creator to delete them. In this case, a delete request may be used to send the suggestion to the creator.

For another example, when the CSE finds that repeated operations occur in the AE and are very frequent, for example, the AE often acquires latest data of a group of containers periodically, and adopts a mode of sending requests respectively, in such case, the AE may be requested to create a group of related container resources to ensure the most efficient operation.

For another example, during a cross-domain operation, an address corresponding to a target domain <CSEBase> is recommended to a corresponding main CSE to recommend the main CSE to directly register with the target domain <CSEBase>.

Therefore, various recommendation information can be received through the virtual resource address, and diversity of the recommendation information is improved.

It should be noted that, the content of the above recommendation information is only an example, and the content of the above recommendation information may be set as desired, which should not be regarded as a limitation to the present application.

In the embodiment of the present application, by setting the virtual resource address, the action executor is determined according to the virtual resource address, and the next action to be executed is recommended to the action executor according to the recommendation information, so that the resource is guided through the virtual resource address, the interaction efficiency and the interaction intelligence are improved, and the time delay is reduced.

Figure 6:
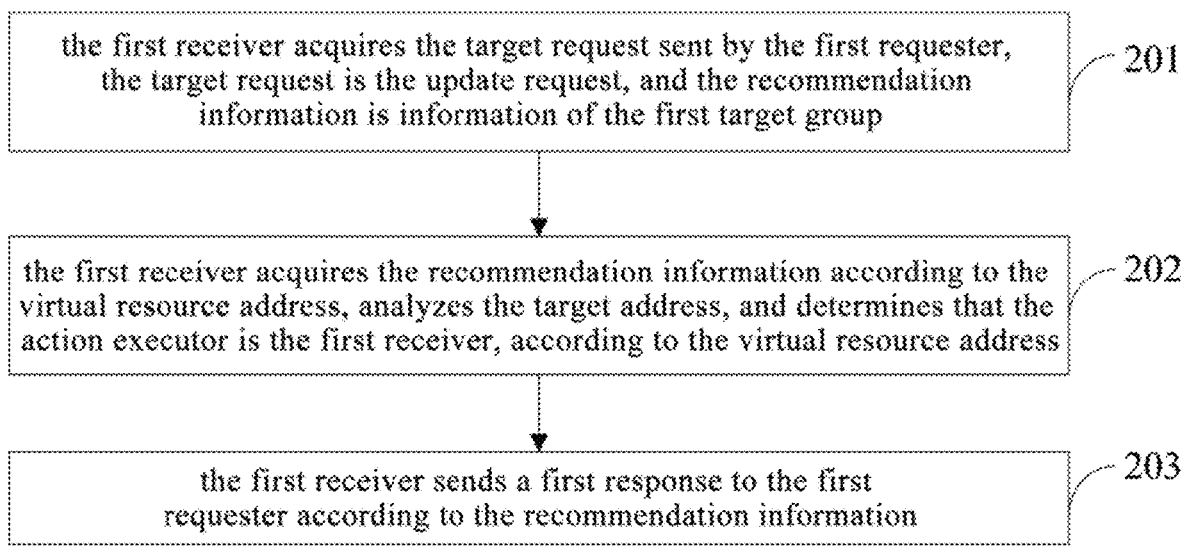

The following is an example of recommending the receiver to join a group, and in some implementations, if the target request is an update request, the recommendation information is information of a first target group, the information of the first target group includes an identifier of the first target group and a member list of the first target group, and the member list of the first target group includes an identifier of the first receiver, the recommendation information is used to recommend an action of joining the first target group to the action executor. FIG. 6 is a schematic flowchart of a method for resource guiding according to an embodiment of the present application.

As shown in FIG. 6, the method for resource guiding includes the following steps 201 to 203.

At the step 201, the first receiver acquires the target request sent by the first requester, the target request is the update request, and the recommendation information is information of the first target group.

In the embodiment, the first receiver receives the update request from the first requester, the update request includes resource information and the target address, the target address includes the virtual resource address, recommendation information included in the resource information is information of the first target group, and the information of the first target group includes the identifier of the first target group, the member list of the first target group, and the like. The member list of the first target group includes an identifier of a member existing in the first target group and an identifier of the first receiver. In the embodiment, the recommendation information is used to recommend, for the action executor, the action of joining the first target group.

At the step 202, the first receiver acquires the recommendation information according to the virtual resource address, analyzes the target address and determines that the action executor is the first receiver according to the virtual resource address.

After receiving the update request, the first receiver analyzes the target address, and determines that the action executor is the first receiver according to the virtual resource address in the target address, that is, the first receiver is the action executor. That is to say, the first requester recommends the first receiver to execute the action of joining the first target group.

At the step 203, the first receiver sends a first response to the first requester according to the recommendation information.

In the embodiment, the recommendation information is used for the first requester to recommend the first receiver to execute the action of joining the first target group, and the first receiver determines, by analysis, whether to accept the recommendation of the first requester according to the recommendation information, and sends a response, referred to as a first response herein, to the first requester, so that the first requester determines whether the first receiver to execute the action of joining the first target group according to whether the first response includes the identifier of the first receiver.

Specifically, if the first response includes the identifier of the first receiver, which indicates that the first receiver agrees to join the first target group, and would execute the action of joining the first target group; and if the first response does not include the identifier of the first receiver, which indicates that the first receiver does not agree to join the first target group, and would not execute the action of joining the first target group.

It should be noted that the first requester may be the CSE, and may be any member of the first target group, or a member of the first target group that is in leader position.

In the embodiment of the present application, the target request is the update request, the recommendation information is information of the first target group, the information of the first target group includes the identifier of the first target group and the member list of the first target group, and the member list of the first target group includes the identifier of the first receiver, the recommendation information is used for recommending, for the action executor, to execute the action of joining the first target group. The first receiver analyses the target address and determines the first receiver as the action executor according to the virtual resource address in the target address, and the first receiver sends the first response to the first requester according to the recommendation information, so that the first requester determines whether the first receiver executes the action of joining the first target group according to whether the first response includes the identifier of the first receiver. Therefore, the first receiver acquires the recommendation information according to the virtual resource address, and determines whether to execute the action of joining the first target group recommended by the first requester according to the recommendation information, so that an entity to be invited to join the group is achieved, and the interaction efficiency among entities is improved.

Figure 7:
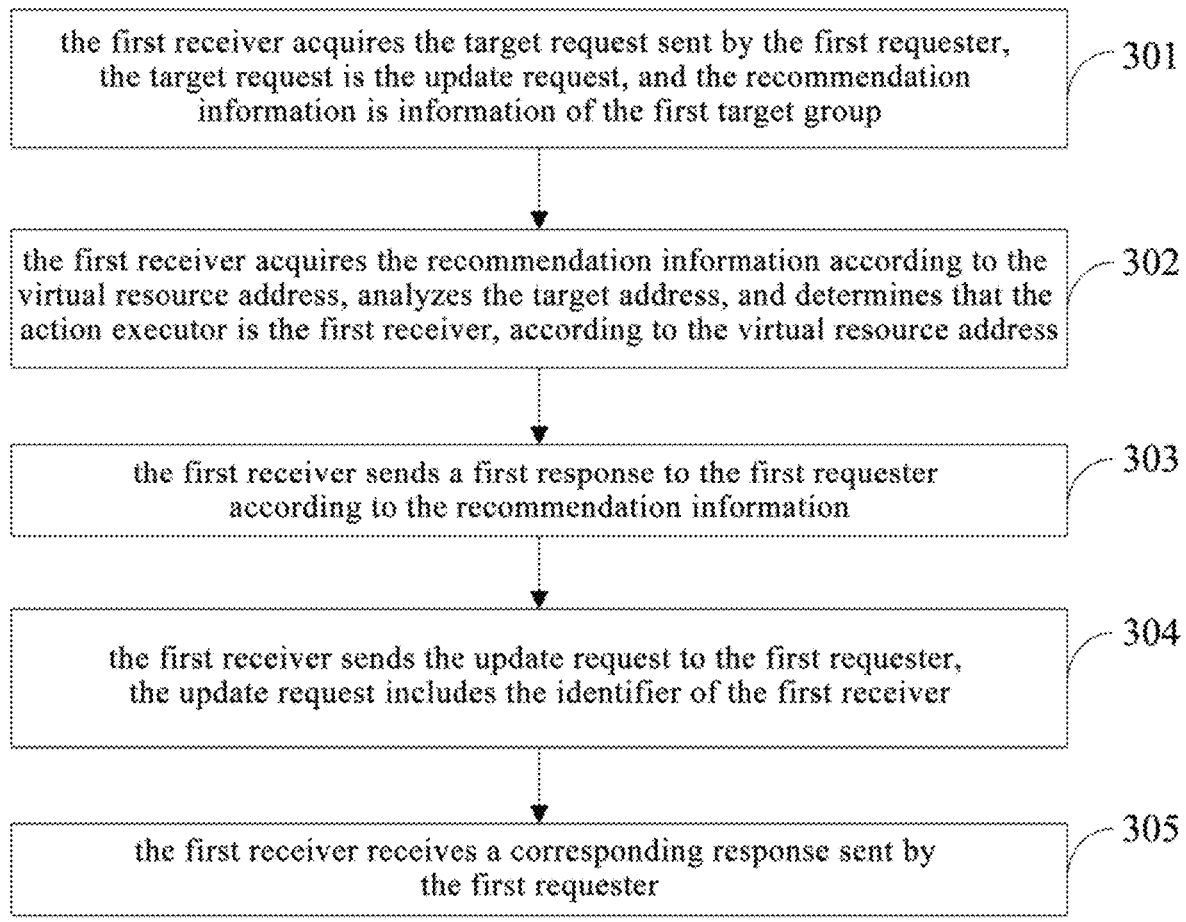

In some implementations, if the first response sent to the first requester in the embodiment shown in FIG. 6 includes the identifier of the first receiver, which indicates that the first receiver agrees to join the first target group, then the first receiver sends a request for joining the group to the first requester to apply for joining the first target group. FIG. 7 is a schematic flowchart of a method for resource guiding according to an embodiment of the present application.

As shown in FIG. 7, the method for resource guiding includes the following steps 301 to 305.

At the step 301, the first receiver acquires the target request sent by the first requester, the target request is the update request, and the recommendation information is information of the first target group.

At the step 302, the first receiver acquires the recommendation information according to the virtual resource address, analyzes the target address and determines that the action executor is the first receiver according to the virtual resource address.

At the step 303, the first receiver sends a first response to the first requester according to the recommendation information.

The steps 301 to 303 of the embodiment are similar to the steps 201 to 203 described above, and therefore are not described herein again.

At the step 304, the first receiver sends the update request to the first requester, the update request includes the identifier of the first receiver.

In the embodiment, if the member list of the first target group in the first response sent to the first requester includes the identifier of the first receiver, after the first response is sent to the first requester, the first receiver may send the update request to the first requester to apply for joining the first target group.

The update request includes information of the first target group, such as the identifier of the first target group, information of the member existing in the first target, and the like, and also includes the identifier of the first receiver.

At the step 305, the first receiver receives the corresponding response sent by the first requester.

After receiving the update request from the first receiver, the first requester adds the first receiver into the first target group in response to that the update request includes the identifier of the first receiver, generates a corresponding response and sends the corresponding response to the first receiver. Thus, the first receiver receives the corresponding response, and from the corresponding response, the first receiver can determine that the first receiver has joined the first target group.

Figure 8:
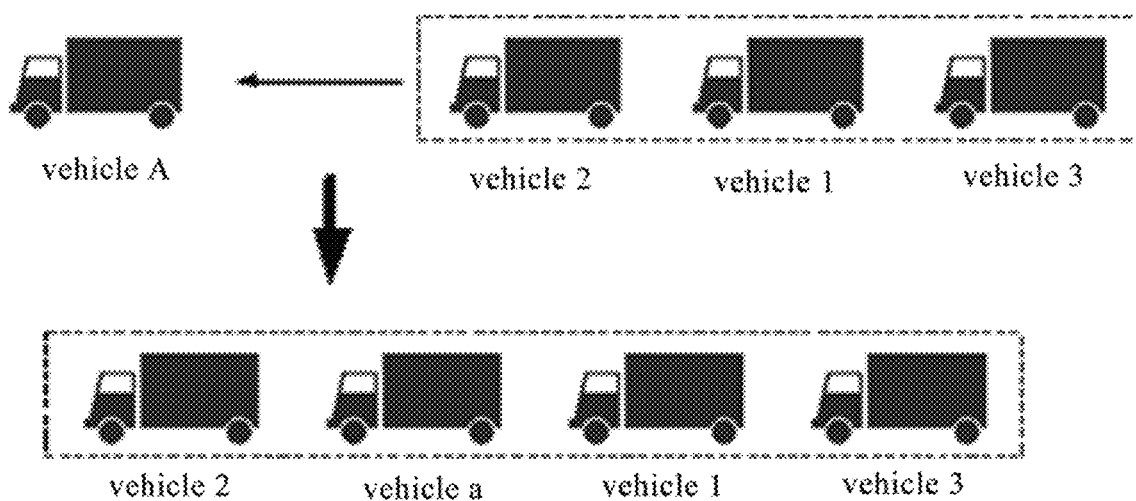
Figure 9:
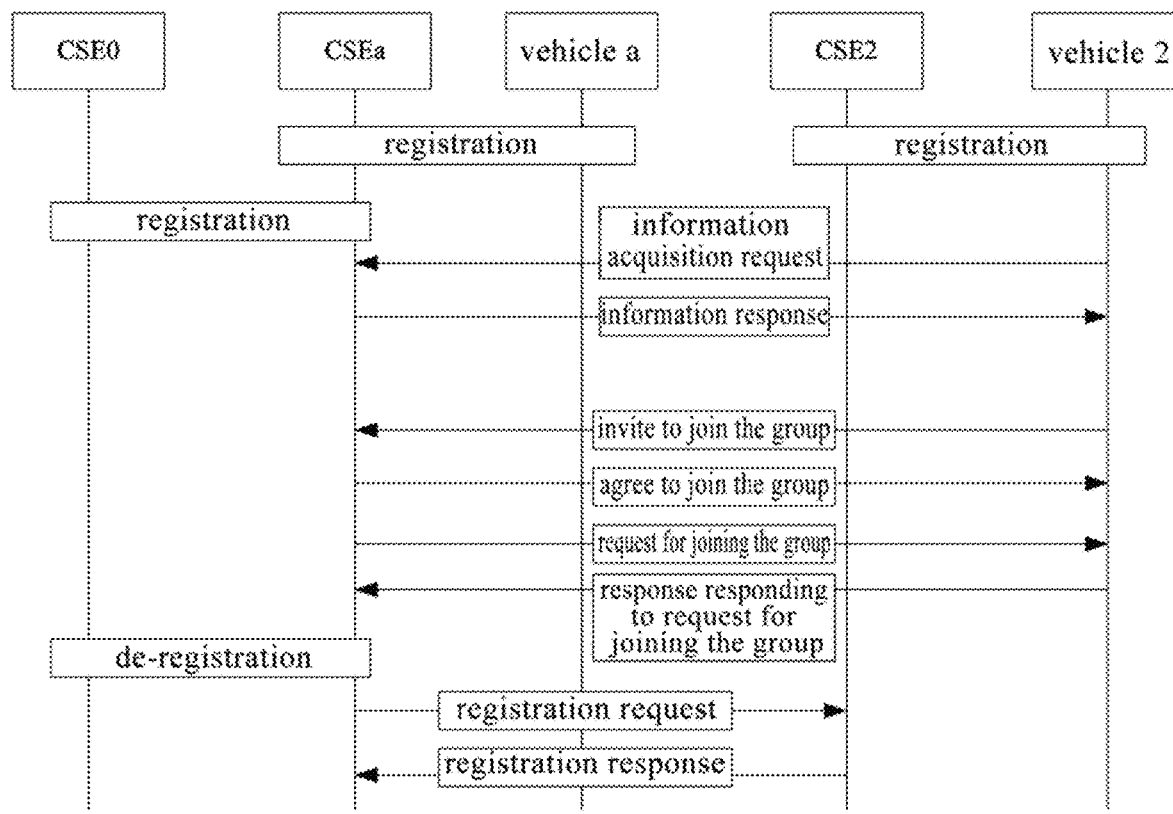

The following will be described in conjunction with FIGS. 8 and 9. FIG. 8 is a schematic diagram illustrating a variation during inviting a vehicle to join a group according to an embodiment of the present application; FIG. 9 is a schematic process diagram of inviting a vehicle to join a group according to an embodiment of the present application.

In FIG. 8, vehicle 1, vehicle 2, vehicle 3 belong to a same vehicle fleet A, and a separate vehicle a is also present. In FIG. 8, the vehicle 2 is an application entity under CSE2, the vehicle a is an application entity under CSEa, and the CSEa and CSE0 are registered with each other.

As shown in FIG. 9, when the vehicle fleet A finds the separate vehicle a, the vehicle 2 in the vehicle fleet sends an information acquisition request, i.e., a request for acquiring information, to the separate vehicle a to acquire information of the vehicle a, such as a destination, a type of carried cargo, and the like. The vehicle a sends a corresponding information response to the vehicle 2. The vehicle 2 sends an update request to the vehicle a according to the acquired information of the vehicle a to invite the vehicle a to join the group, that is, invite the vehicle a to join the vehicle fleet A, the update request includes information of the vehicle fleet A, such as a destination of the vehicle fleet A, a type of a cargo carried by each vehicle in the vehicle fleet, and the like. After receiving the update request, the vehicle a determines to join the vehicle fleet A by analyzing the information of the vehicle fleet A and the information of the vehicle a itself, and sends a group joining response to the vehicle 2 to agree to join the vehicle fleet A.

Then, the vehicle a sends the group joining request to the vehicle 2 to apply for joining the vehicle fleet A, and after receiving the group joining request, the vehicle 2 sends a group joining response to the vehicle a to agree the vehicle a to join the vehicle fleet A.

Thereafter, the CSEa deregisters with the CSE0 and sends a registration request to the CSE2 to which the vehicle 2 belongs, and the CSE2 feeds back a registration response to agree the registration. In such case, the vehicle a successfully joined the vehicle fleet A, as shown in FIG. 8.

It should be noted that, the order of the registration request and the group joining request in FIG. 9 may be exchanged, that is, the registration request may be sent first, and after the registration is successful, the group joining request is sent to apply for joining the group.

In the embodiment of the present application, if the member list of the first target group in the first response includes the identifier of the first receiver, after the first response is sent to the first requester, the first receiver may further send the update request to the first requester, the update request includes the identifier of the first receiver, and then the first receiver receives the corresponding response sent by the first requester. Therefore, after the first receiver agrees to join the group, the first receiver sends the update request to the first requester to apply for joining the group, an interactive operation according to the action for joining the group recommended by the first requester is carried out, and interaction efficiency and interaction intelligence among entities are improved.

Figure 10:
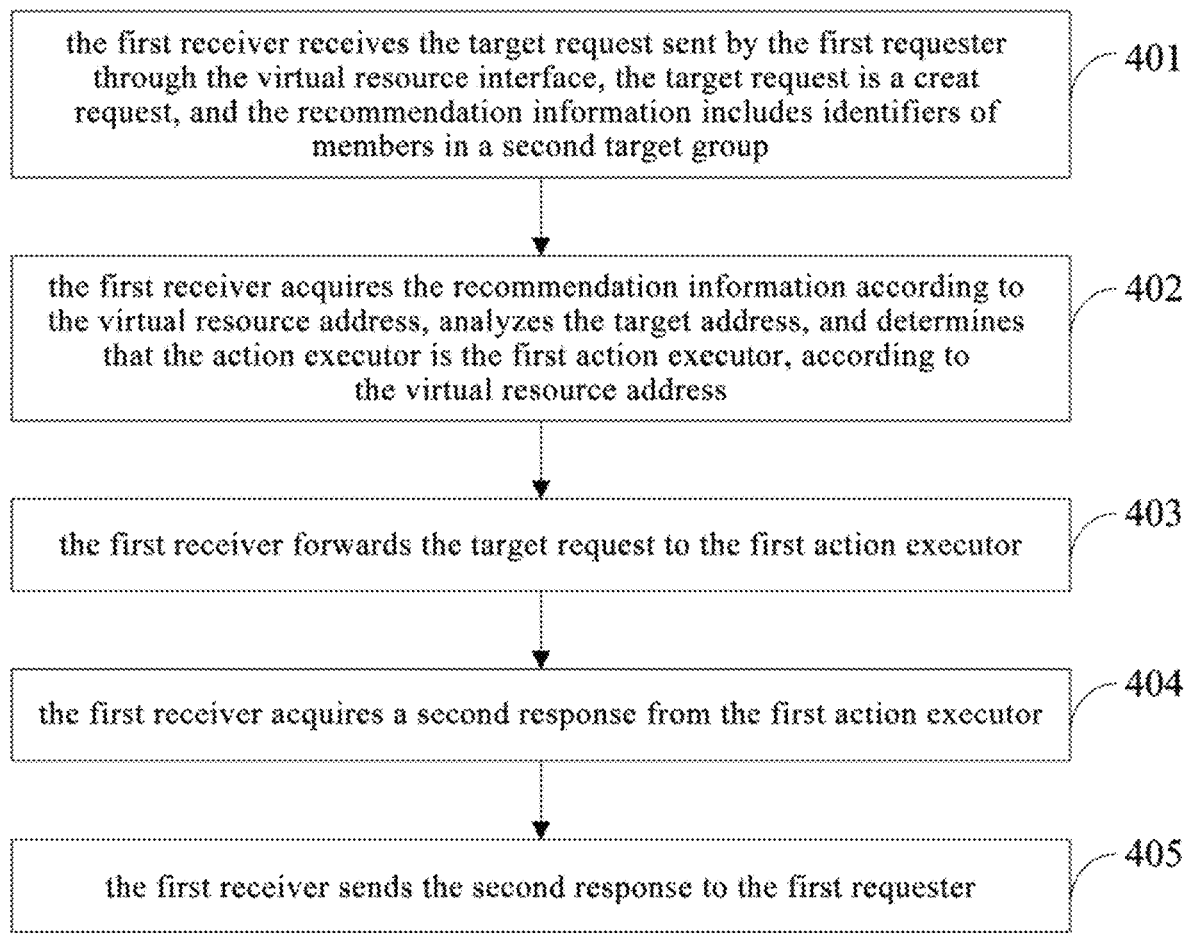

In practice applications, the controls for some devices are usually the same, for example, in afternoon, all curtains in the west of an office are pulled down. To improve control efficiency, in some implementations, the first requester may send a request for creating a group to the first receiver, i.e., recommend the action executor to create a new group. FIG. 10 is a schematic flowchart of a method for resource guiding according to an embodiment of the present application.

As shown in FIG. 10, the method for resource guiding includes the following steps 401 to 405.

At the step 401, the first receiver receives the target request sent by the first requester through a virtual resource interface, the target request is a create request, and the recommendation information includes identifiers of members in a second target group.

In the embodiment, the first receiver acquires the target request sent by the first requester, the target request is the create request. The recommendation information in the create request includes the identifiers of the members in the second target group, and the recommendation information is used to recommend the action for creating the second target group to the action executor. Here, the members refer to members to be included in the second target group that the first requester recommends to create, that is, it is recommended to group the members into one group.

At the step 402, the first receiver acquires the recommendation information according to the virtual resource address, analyzes the target address and determines a first action executor as the action executor according to the virtual resource address.

The first receiver acquires the recommendation information according to the virtual resource address in the target address, analyzes the target address, and determines the first action executor as the action executor according to the virtual resource address, the first action executor is different from the first receiver. In the embodiment, the recommendation information is used to recommend the action of creating the second target group to the first action executor.

At the step 403, the first receiver forwards the target request to the first action executor.

After determining the first action executor, the first receiver forwards the target request to the first action executor, and according to the recommendation information, the first action executor determines that the next action, to be executed, recommended by the first requester is to create the second target group.

At the step 404, the first receiver acquires a second response from the first action executor.

After receiving the target request, the first action executor determines whether to accept the recommendation of the first requester to create the second target group according to the identifier of each member in the second target group in the recommendation information and the state of the first action executor itself (such as whether the first action executor has joined another group). If the first action executor accepts the recommendation, the first action executor creates the second target group, or if the first action executor does not accept the recommendation, the first action executor generates the second response and sends the second response to the first receiver. The second response includes information about whether the second target group has been created successfully.

At the step 405, the first receiver sends the second response to the first requester.

After the first receiver acquires the second response from the first action executor, the first receiver sends the second response to the first requester, so that the first requester determines whether the second target group has been created successful) according to whether the second response includes the information of the second target group.

Specifically, if the second response includes information indicating that the second target group has been successfully created, it can be determined that the first action executor accepts the recommendation of the first requester and has successfully created the second target group. If the second response includes information indicating that the second target group was not successfully created, it can be determined that the first action executor does not execute the next action recommended by the first requester.

Alternatively, whether the second target group has been successfully created may also be determined according to whether the second response includes information of the second target group. If the second response includes information such as the identifier of the second target group, the identifiers of the members of the second target group, and the like, it can be determined that the second target group has been successfully created; if the second response does not include the information of the second target group, it indicates that the second target group was not successfully created.

It should be noted that the first requester may be an application provided by a management platform or a vendor, and the first receiver may be a specific entity device or a management device for managing the members of the group.

Taking an office scene as an example, a management ipad, for managing equipments, held by an administrative staff sends an instruction for the equipments to a management server, and the management server performs operations for the instruction:

every morning, all the intelligent curtains in the east of the office are pulled down (instructions are separately sent to 100 motors for controlling the curtains);

every morning, all the intelligent curtains in the west of the office are pulled up (instructions are separately sent to 100 motors for controlling the curtains);

every afternoon, all the intelligent curtains in the east of the office are pulled up (instructions are separately sent to 100 motors for controlling the curtains);

every afternoon, all the intelligent curtains in the west of the office are pulled down (instructions are separately sent to 100 motors for controlling the curtains);

every night, all the intelligent curtains in the east of the office are pulled up (instructions are separately sent to 100 motors for controlling the curtains); and every night, all the intelligent curtains in the west in the office are pulled up (instructions are separately sent to 100 motors for controlling the curtains).

Figure 11:
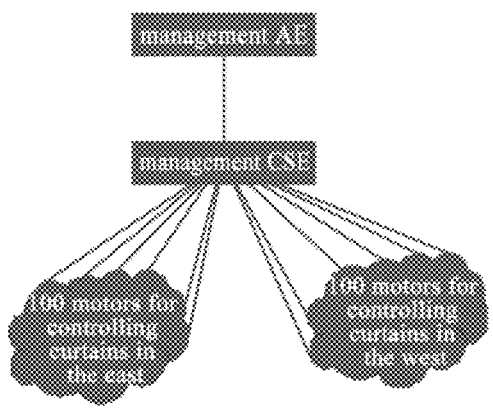

Based on the operations of the management server, the CSE of the management server may perform the operation of recommending the group according to records of historical commands and requests. In such scene, for the intelligent curtains in the east of the office (100 motors for controlling the curtains), a first group is formed, for the intelligent curtains in the west of the office (100 motors for controlling the curtains), a second group is formed, information of recommending to create such groups is sent to the management AE, the management AE sends the information to the corresponding management CSE, and the management CSE creates the groups, as shown in FIG. 11, FIG. 11 is a schematic diagram illustrating groups of motors for controlling the curtains according to an embodiment of the present disclosure.

Figure 12:
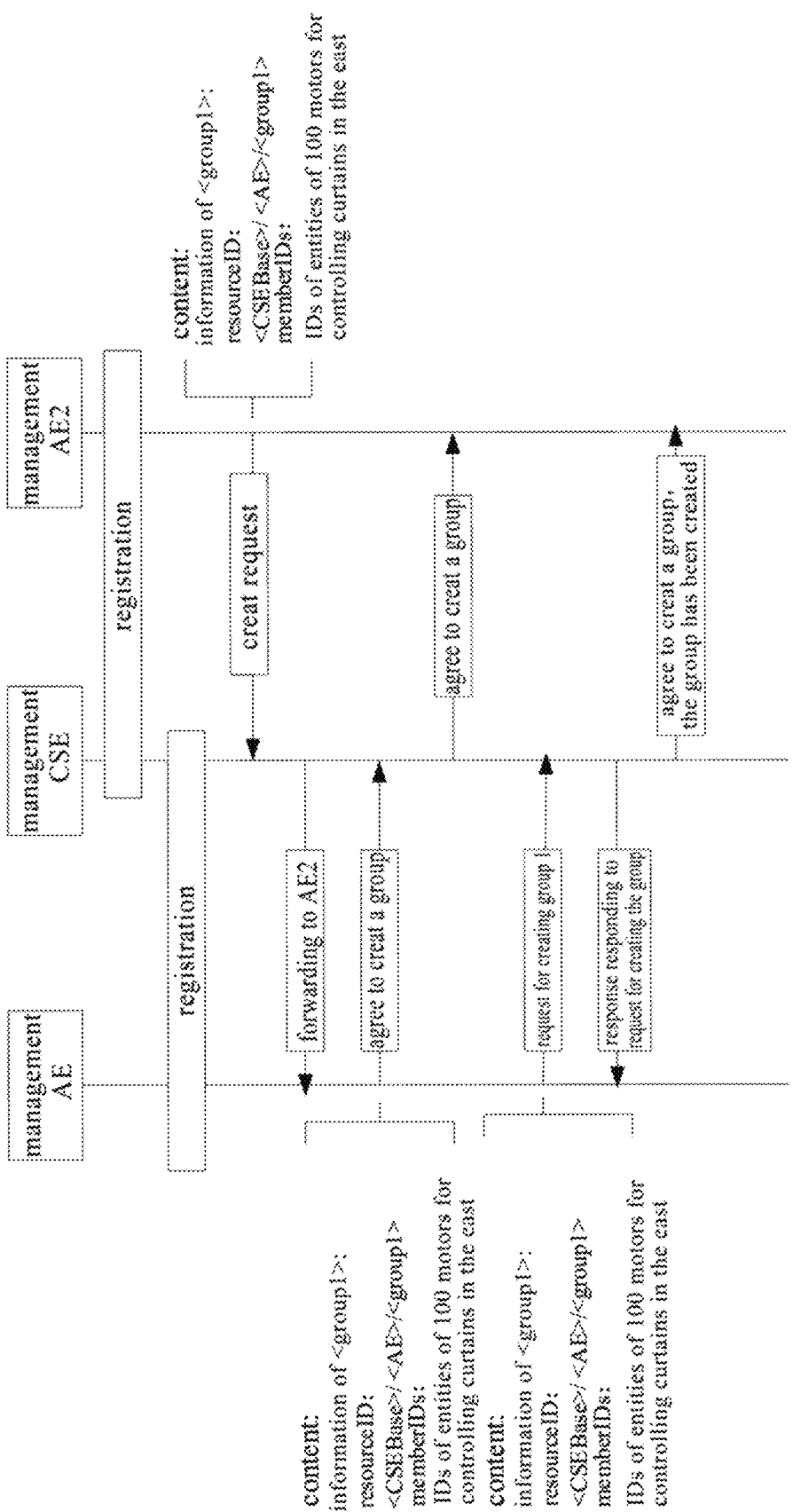
FIG. 12 is a schematic diagram of a process for creating a group according to an embodiment of the present application.

The following describes a process for creating the group for the intelligent curtains (100 motors for controlling the curtains) in the east of the office, with reference to FIG. 12, FIG. 12 is a schematic diagram of a process for creating the group according to an embodiment of the present application.

As shown in FIG. 12, both the management AE and a management AE2 are registered on the management CSE, the management AE2 is the first requester, the management CSE is the first receiver, the management AE is the first action executor, and the management AE2 sends a create request to a position of <recommandOperation> of the corresponding CSEBase, which is <CSEBase>/<AE>/<recommandOperation> herein. The content of the create request includes information of recommending to create the group, such as resourceID: <CSEBase>/<AE>/<group1>; and memberIDs: the IDs of the entities of the 100 motors for controlling the curtains in the east of the office. From the resourceID, the receiver of the create request can know the recommended creation site, and from the membersIDs, the receiver of the create request can know which entities are members forming the group of <group1>, that is, the entities of the 100 motors for controlling the curtains in the east herein.

The management CSE judges the position of <recommandOperaction> in the address according to the information of the target address in the create request, and determines a designated management AE and forwards the create request.

The AE analyzes and replies a response of whether to create the group, and if the AE agrees to create the group, the response includes information of recommending to create the group; if the AE does not agree to create the group, the content of the response does not include the information of recommending to create the group, and is empty. In FIG. 12, the management AE agrees to create the group for the 100 curtains in the east, generates a response, and sends the response of agreeing to create the group to the management CSE, and the management CSE forwards the response of agreeing to create the group to the management AE2.

The management AE sends a request for creating <group1> to the management CSE, the request includes information of resourceID of the group: <CSEBase>/<AE>/<group1>; and memberIDs: the IDs of the entities of the 100 motors for controlling the curtains in the east. The management CSE creates the group according to the request for creating <group1>, and sends a response, indicating agreeing to create the group and that the group has been created, to the requester.

In the response indicating agreeing to create the group sent from the management CSE to the management AE2, the information of the sender should be forwarded to the requester together, the sender here is the management AE, so that a conflict with the response of agreeing to create the group is avoided, and the content information of the response indicating agreeing to create the group is information recommended by the requester; then, if the requester desires to check the creation, the requester may directly acquire the address of the recommended <group1> to acquire whether the creation is successful or not.

The response indicating agreeing to create the group is declared by the CSE, the sender of the response is the management CSE, the response indicating agreeing to create the group is the same, in structure, as the response of creating the group sent from the management AE to the management CSE, only the information of the receiver is changed, and the content information of such two responses is consistent, thus the information sent from the management CSE is sent to the requester, and the requester can know that the related management AE agrees with the recommendation of the requester and the group has been successfully created.

In practical applications, products of different manufacturers may control a same object, for example, when a gas monitoring device monitors that the gas concentration in the air exceeds a warning threshold, the gas monitoring device acts to trigger a controller for controlling a door and/or a window to open the door and/or the window for ventilation; when an air monitoring and purifying device detects that the concentration of PM2.5 in the air exceeds a warning threshold, the air monitoring and purifying device acts to trigger the controller for controlling the door and/or the window to close the door and/or the window. Therefore, both the gas monitoring device and the air monitoring and purifying device control the controller for controlling the door and/or the window.

In order to reduce gaps between products of different manufacturers and improve intelligence of controlling, in some implementations, before the first receiver acquires the target request sent by the first requester, the first receiver may send a request, for creating an action resource for an object for controlling, to the first requester.

The request for creating the action resource includes information of a first action resource, the action resource here refers to an action of the object for controlling, for example, in the above example, the controller for controlling the door and/or the window is the object for controlling, and the action resource may include opening the door and/or the window.

After receiving the request for creating the action resource, the first requester may generate a response, referred to as a third response herein, according to an action that have been created for the object for controlling and the first action resource, and then send the third response to the first receiver. Thus, the first receiver acquires the third response, responding to the request for creating the action resource, from the first requester, and can determine whether the creation of the first action resource is successful according to the third response.

Taking the gas monitoring device and the air monitoring and purifying device as examples, then a service layer is the first requester, and the gas monitoring device or the air monitoring and purifying device may be the first receiver. Specifically, the gas monitoring device may send a request for creating an action of opening the door and/or the window to the service layer, and the air monitoring and purifying device may send a request for creating an action of closing the door and/or the window to the service layer. Therefore, the gas monitoring device and the air monitoring and purifying device can acquire corresponding responses, respectively.

In the embodiment of the present application, before the first receiver acquires the target request sent by the first requester, the first receiver may send the request for creating the action resource for the object for controlling to the first requester, the request for creating the action resource includes information of the first action resource; and the first receiver acquires the third response, responding to the request for creating the action resource, from the first requester. Therefore, the request for creating the action resource may be sent to the requester, so that the action resource is created by the requester, the gaps among products of different manufacturers are reduced.

In practical applications, the third response received by the first receiver may be a failure response indicating that the creation of the first action resource fails. Based on this, in some implementations, if the third response is the failure response, the first requester may send recommendation information to the first receiver to recommend the first receiver to acquire information of another action resource for the same object for controlling. The following will be explained in combination with FIG. 13, and FIG. 13 is a schematic flowchart of a method for resource guiding according to an embodiment of the present application.

Figure 13:
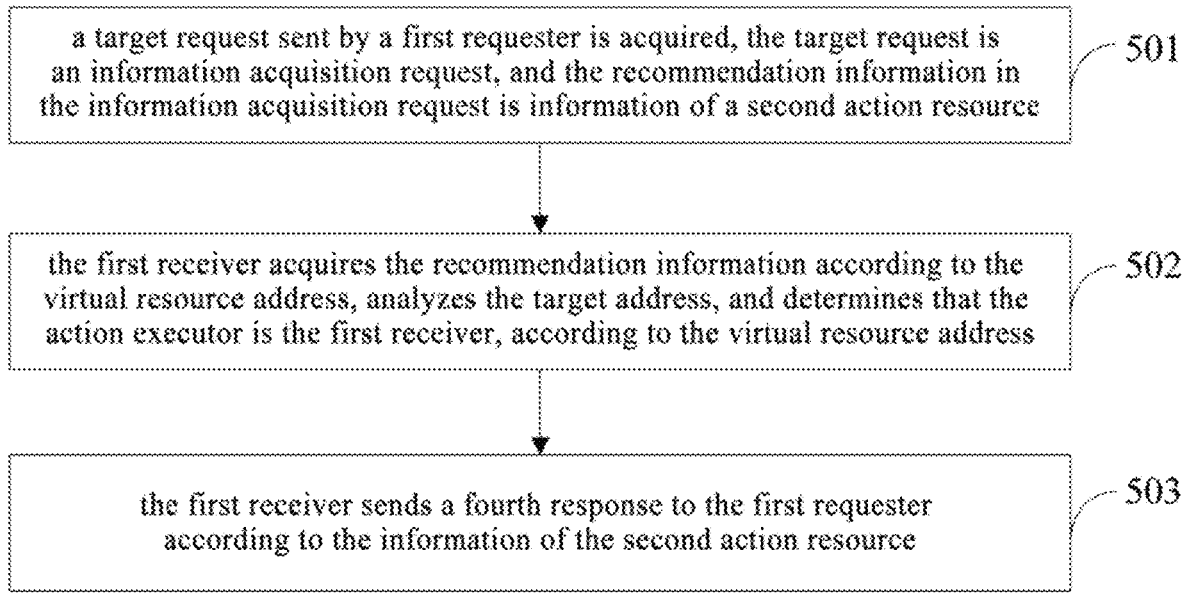
FIG. 13 is a schematic flowchart of a method for resource guiding according to an embodiment of the present application.

As shown in FIG. 13, the method for resource guiding includes the following steps 501 to 503.

At the step 501, a target request sent by a first requester is acquired, the target request is an information acquisition request, i.e., a request for acquiring information, and the recommendation information in the information acquisition request is information of a second action resource.

In the embodiment, the first receiver sends a request, for creating an action resource for the object for controlling, to the first requester, the request for creating the action resource includes information of the first action resource.

The first requester determines that the first action resource and the created second action resource conflict, according to the first action resource and the created second action resource, and then generates a first response, which is a failure response, to be sent to the first receiver. As above, the failure response is generated by the first requester when the first action resource conflicts with the created second action resource.

The second action resource here may be created by the first requester according to the request, for creating the action resource for the object for controlling, sent from another entity device to the first requester, that is, both the first action resource and the second action resource may be action resources for the object for controlling. For example, for the controller for controlling the door and/or the window, the first action resource is to open the door and/or the window, and the second action resource is to close the door and/or the window.

After sending the failure response to the first receiver, the first requester sends a target request to the first receiver, the target request is an information acquisition request, i.e., a request for acquiring information, and a target address of the target request includes a virtual resource address. Recommendation information in the information acquisition request is the information of the second action resource, the recommendation information is used for recommending, for the action executor, to execute an action of acquiring the information of the second action resource.

At the step 502, the first receiver acquires the recommendation information according to the virtual resource address, analyzes the target address and determines that the action executor is the first receiver according to the virtual resource address.

The first receiver analyzes the target address, and determines that the action executor is the first receiver according to the virtual resource address included in the target address. That is, the first receiver is also the action executor, and the first requester recommends the first receiver to execute the action of acquiring the information of the second action resource.

At the step 503, the first receiver sends a fourth response to the first requester according to the information of the second action resource.

After acquiring the information acquisition request, the first receiver generates the fourth response according to the information acquisition request, such as a type of the information acquisition request, the information of the second action resource, and the like. Then the first receiver sends the fourth response to the first requester. The fourth response here is used by the first receiver to inform the first requester that the information acquisition request sent by the first requester has been received.

In the embodiment of the present application, when the action resource requested to be created conflicts with the created action resource to cause the creation to be failure, a recommendation operation for acquiring the created action resource may be received to check the created action, so that the reason for the failure of creating the action resource requested by the first requester can be analyzed, the interaction efficiency and the intelligence among entity apparatuses are improved, and the time delay is reduced.

In some implementations, after sending the fourth response to the first requester, the first receiver may send a first acquisition request to the first requester to acquire the information of the second action resource.

After acquiring the first acquisition request for acquiring the second action resource, the first requester sends a response corresponding to the first acquisition request to the first receiver, the response includes the information of the second action resource. Therefore, the first receiver may acquire the second action resource, and then update the first action resource according to the second action resource, that is, create a new first action resource, so as to solve the problem that the first action resource conflicts with the second action resource.

After updating the first action resource, the first receiver sends an updated request for creating an action resource to the first requester, the updated request for creating the action resource includes information of the updated first action resource, so that the first requester creates the new first action resource, and the new first action resource does not conflict with the second action resource. For example, a condition for triggering the first action resource may be added so that the first action resource does not conflict with the second action resource.

Further, if the first requester has created a plurality of action resources and the action resource that the first receiver requests to create conflicts with multiple created action resources, the recommendation information in the information acquisition request sent to the first receiver includes identifiers of multiple actions, so as to recommend the first receiver to execute an action of acquiring the multiple created action resources. If the first receiver accepts the recommendation, the first receiver sends an acquisition request to the first requester to acquire the multiple created action resources, so as to update the first action resource according to the multiple created action resources, and request to create the updated first action resource again, thereby avoiding the conflict between the updated first action resource to be created and the created action resources.

In the embodiment of the present application, after the first receiver sends the fourth response, the first receiver sends the first acquisition request to the first requester, and receives a response corresponding to the first acquisition request sent by the first requester, the response corresponding to the first acquisition request includes the information of the second action resource. Therefore, after the first receiver accepts the recommendation, to execute the action of acquiring the second action resource, from the first requester, the first receiver may acquire the second action resource by sending an acquisition request to the first requester, so as to update the first action resource according to the second action resource, so that the conflict between the first action resource and the second action resource is avoided, the interaction efficiency and the intelligence are improved, and the time delay is reduced.

In some implementations, the first requester may recommend a new first action resource to the first receiver if the creation of the action resource requested by the first receiver fails. The following will be described in conjunction with FIG. 14, FIG. 14 is a schematic flowchart of a method for resource guiding according to an embodiment of the present application.

Figure 14:
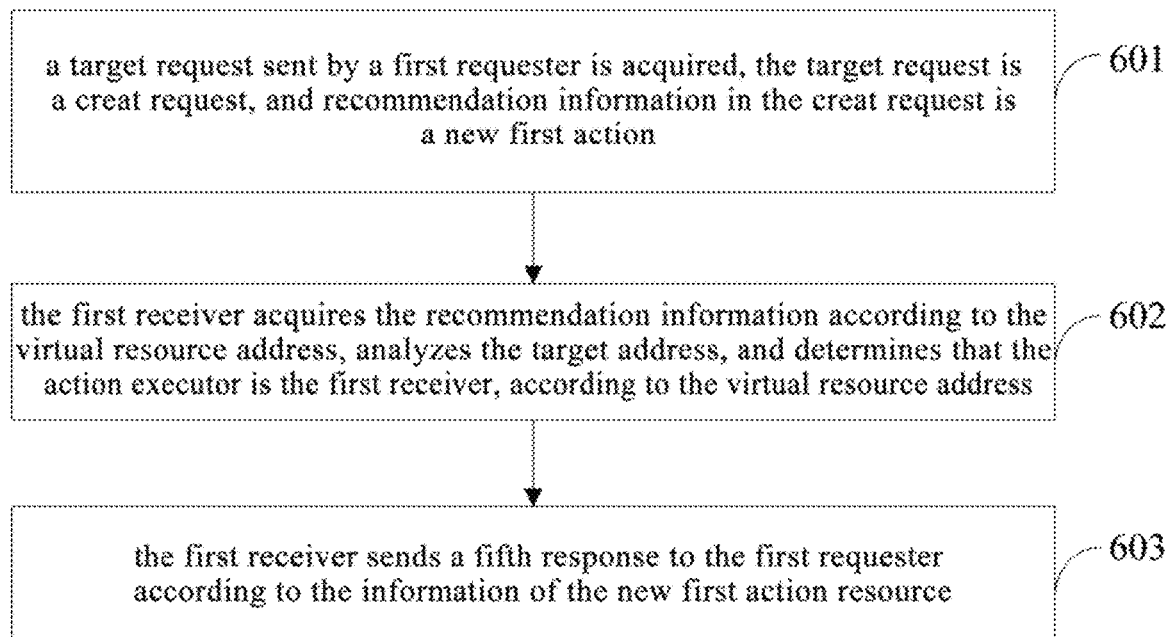
FIG. 14 is a schematic flowchart of a method for resource guiding according to an embodiment of the present application.

As shown in FIG. 14, the method for resource guiding includes the following steps 601 to 603.

At the step 601, a target request sent by a first requester is acquired, the target request is a create request, and recommendation information in the create request is a new first action.

In the embodiment, the first receiver sends a request, for creating an action resource for the object for controlling, to the first requester, the request for creating the action resource includes information of a new first action resource.

The first requester determines that the first action resource and the created second action resource conflict according to the first action resource and the created second action resource, and then generates a third response, which is a failure response, to be sent to the first receiver. As above, the failure response is generated by the first requester when the first action resource conflicts with the created second action resource.

The second action resource here may be created by the first requester according to the request, for creating the action resource for the object for controlling, sent from another entity device to the first requester, that is, the first action resource and the second action resource may be action resources for a same object for controlling. For example, for a controller for controlling a door and/or a window, the first action resource is to open the door and/or the window, and the second action resource is to close the door and/or the window.

After sending the failure response to the first receiver, the first requester sends the target request to the first receiver, the target request is a create request, the recommendation information in the create request is information of a new first action resource, and the recommendation information in the create request is used for recommending, for the action executor, to execute an action of creating the new first action resource. The new first action resource is determined by the first requester according to the first action resource and the created second action resource, the new first action resource does not conflict with the created second action resource. The created second action resource may be one or more in number.

At the step 602, the first receiver acquires the recommendation information according to the virtual resource address, analyzes the target address, and determines that the action executor is the first receiver according to the virtual resource address.

The first receiver analyzes the target address, and determines that the action executor is the first receiver according to the virtual resource address included in the target address. That is, the first receiver is also the action executor, and the first requester recommends the first receiver to execute the action of creating the new first action resource.

At the step 603, the first receiver sends a fifth response to the first requester according to the information of the new first action resource.

In the embodiment, the first receiver generates the fifth response according to a type of the request, the new first action resource carried by the request, and the like, and sends the fifth response to the first requester. The fifth response here is used by the first receiver to inform the first requester that the create request that the first requester sent has been received.

After the fifth response is sent to the first requester, first receiver update the first action resource according to the information of the new first action resource carried in the create request, and then sends an updated request for creating an action resource to the first requester, the updated request for creating the action resource includes the information of the updated first action resource, so that the first requester creates the updated first action resource according to the updated request for creating the action resource.

In the embodiment of the present application, if a failure response, responding to the request for creating the action resource, is acquired from the first requester, an update request including recommendation information being the new first action resource may be received from the first requester, so as to acquire the information of the new first action resource sent by the first requester. Therefore, the first receiver constructs the new first action resource according to the acquired information of the new first action resource, so as to re-request to create the new first action resource, so that the interaction efficiency and the interaction intelligence are improved, and the time delay is reduced.

For a scene of creating a trigger action, in some implementations, when the first action resource requested, by the first receiver, to be created by the first requester has been successfully created, and then the first requester further successfully creates a third action resource, the first requester may recommend an action, for acquiring information of the third action source, to the action executor. The following will be described in conjunction with FIG. 15, FIG. 15 is a schematic flowchart of a method for resource guiding according to an embodiment of the present application.

Figure 15:
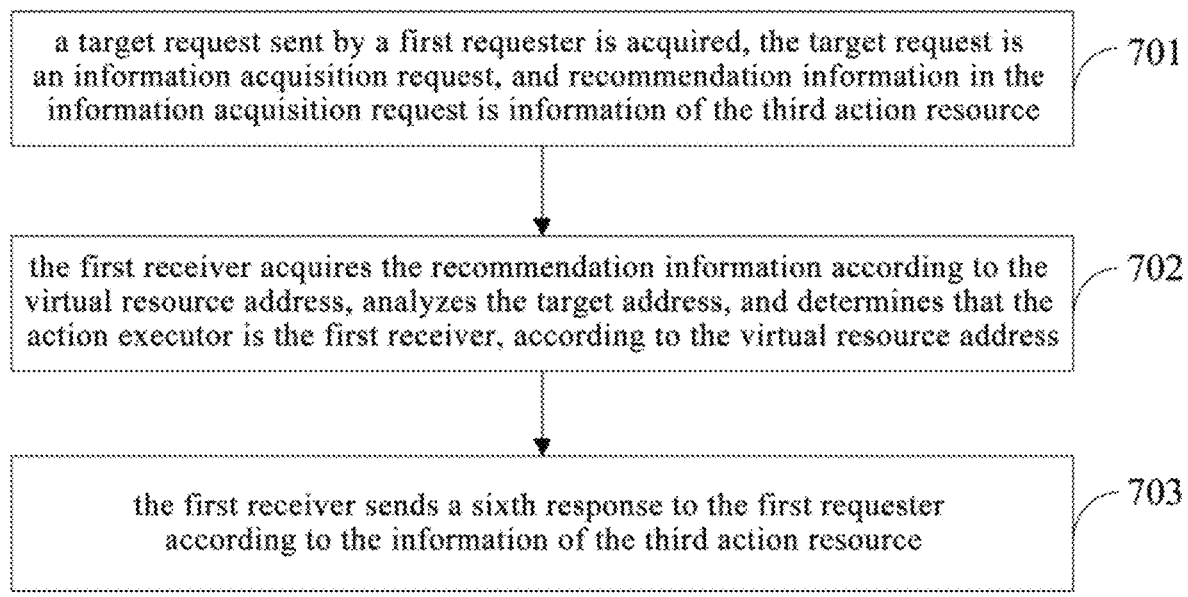
FIG. 15 is a flowchart illustrating a method for resource guiding according to an embodiment of the present application.

As shown in FIG. 15, the method for resource guiding includes the following steps 701 to 703.

At the step 701, a target request sent by a first requester is acquired, the target request is an information acquisition request, i.e., a request for acquiring information, and recommendation information in the information acquisition request is information of the third action resource.

In the embodiment, the first receiver sends a request, for creating an action resource for the object for controlling, to the first requester, the request for creating the action resource includes the information of the third action resource.

The first requester creates a first action resource according to the request for creating the action resource, and generates and sends a third response, i.e., a successful response, to the first receiver.

Then, the first receiver acquires the target request, the target request is the information acquisition request, and the recommendation information in the information acquisition request is information including the third action resource, so that the recommendation information is used for recommending an action, for acquiring the information of the third action resource, to the action executor. The third action resource is created by the first requester after the first action resource is created and is for the same object for controlling as the first action resource.

At the step 702, the first receiver acquires the recommendation information according to the virtual resource address, analyzes the target address, and determines that the action executor is the first receiver according to the virtual resource address.

The first receiver analyzes the target address, and determines the action executor as the first requester according to the virtual resource address included in the target address. That is to say, the first requester recommends the first receiver to execute the action of acquiring the information of the third action resource.

At the step 703, the first receiver sends a sixth response to the first requester according to the information of the third action resource.

The first receiver can determine that the first requester recommends the first receiver to acquire the information of the third action resource, according to that the information acquisition request includes the information of the third action resource, so as to check the third action resource.

The first receiver generates the sixth response according to a type of the target request (i.e., the information acquisition request), the information of the third action resource in the information acquisition request, and the like. Then, the first receiver sends the sixth response to the first requester, so that the first requester knows that the first receiver has received the information acquisition request sent by the first requester.

After the first receiver sends the sixth response to the first requester, the first receiver may send a second acquisition request to the first requester to check the information of the third action resource. The first receiver receives a response corresponding to the second acquisition request sent by the first requester, the response corresponding to the second acquisition request includes the information of the third action resource. Then, the first receiver updates the first action resource according to the information of the third action resource. Next, the first receiver sends an updated request for creating an action resource to the first requester, the updated request for creating the action resource includes the information of the updated first action resource, so that the first requester creates a new first action resource.

In the embodiment of the present application, after the first action resource for the object for controlling is created, if the first requester receives a request, for creating an action resource for the object for controlling, sent by another device, the request for creating the action resource includes a second action resource. In order to avoid the conflict between the first action resource and the second action resource, after the second action resource is created, the first requester may make a reverse recommendation to the first receiver requesting to create the first action resource, to recommend the first receiver to check the second action resource. The reverse recommendation is performed, so that the first receiver updates the first action resource according to the second action resource, the conflict between the first action resource and the second action resource is avoided, the interaction efficiency and the interaction intelligence are improved, and the time delay is reduced.

Figure 16:
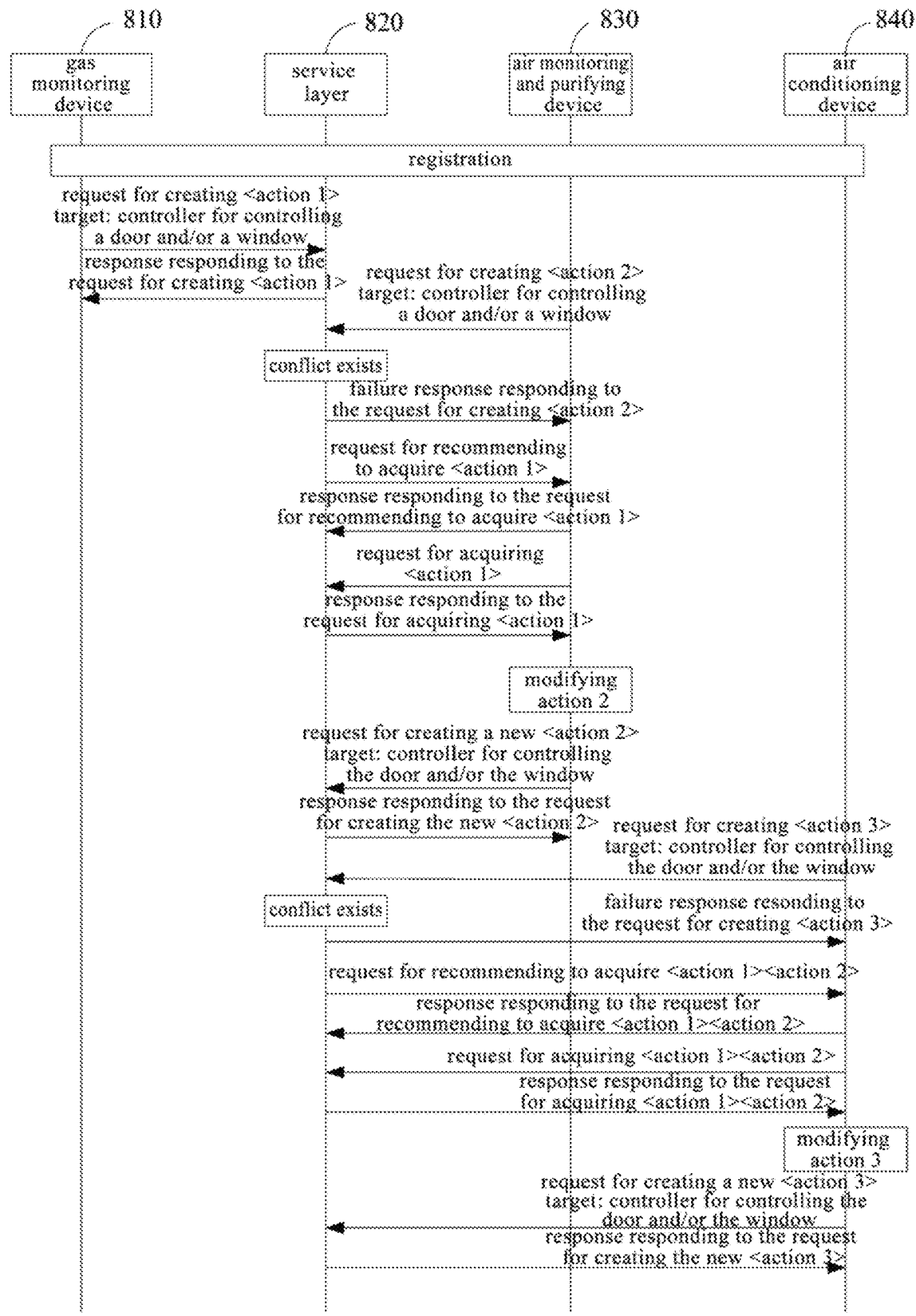
FIG. 16 is a schematic diagram illustrating a single recommendation and multiple recommendations according to an embodiment of the present application.
Figure 17:
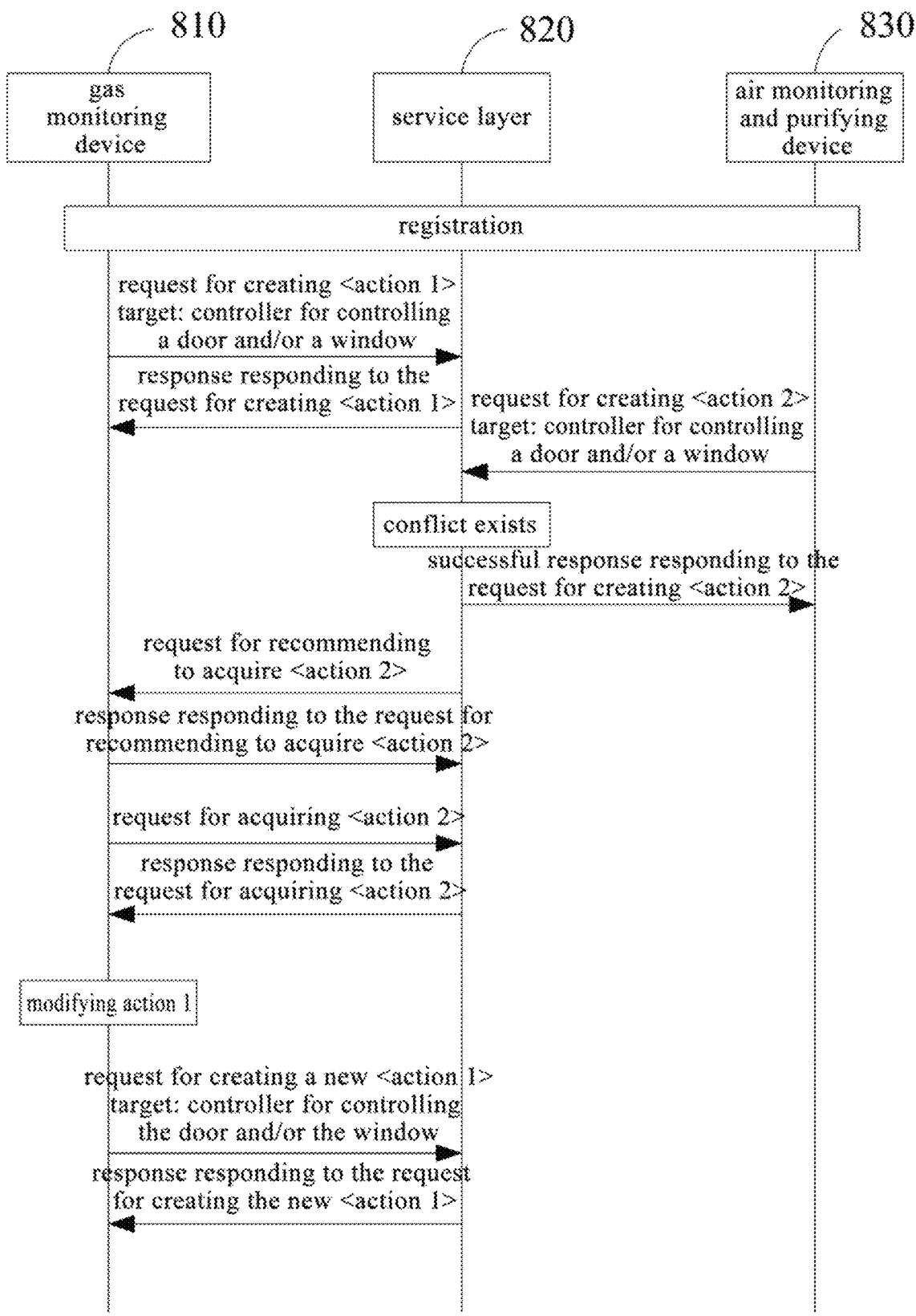
FIG. 17 is a schematic diagram of a reverse recommendation according to an embodiment of the present application.
Figure 18:
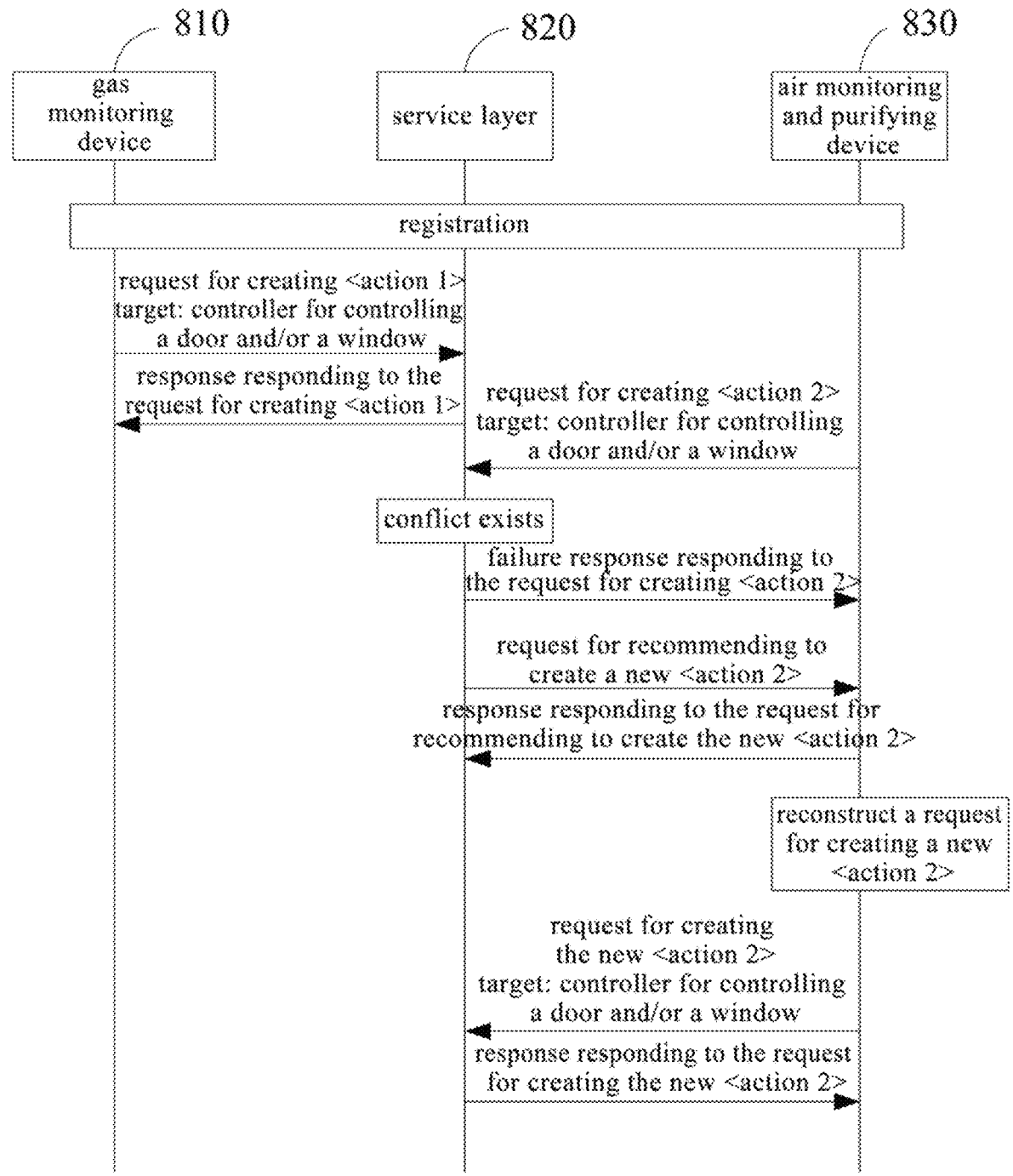
FIG. 18 is a schematic diagram illustrating a recommendation with a creation result according to an embodiment of the present application.

The embodiment is described below with reference to FIGS. 16, 17, and 18, FIG. 16 is a schematic diagram of a single recommendation and multiple recommendations according to an embodiment of the present application; FIG. 17 is a schematic diagram of a reverse recommendation according to an embodiment of the present application;

FIG. 18 is a schematic diagram illustrating a recommendation with a further creation result according to an embodiment of the present application.

In FIG. 16, a gas monitoring device 810 sends a request for creating <action 1> to a service layer 820, a target of the action 1 is a controller for controlling a door and/or a window. The service layer 820 creates the action 1 according to the request for creating <action 1> and sends a response of creating <action 1> to the gas monitoring device 810. The service layer 820 may be a smart home management platform.

An air monitoring and purifying device 830 sends a request for creating <action 2> to the service layer 820, and since the action 1 conflicts with the action 2, the service layer 820 sends a failure response of creating <action 2> to the air monitoring and purifying device 830. A target of the action 2 is the controller for controlling the door and/or the window.

The service layer 820 sends a request, for recommending to acquire <action 1>, to the air monitoring and purification device 830, i.e., recommends the air monitoring and purifying device 830 to execute the action of acquiring the action 1 so as to check the action 1. The air monitoring and purifying device 830 determines to accept the recommendation of the service layer 820 according to the request for recommending to acquire <action 1>, and sends a response, responding to the recommendation of acquiring <action 1>, to the service layer 820, and the service layer 820 may determine that the air monitoring and purifying device 830 has agreed with the recommendation, according to the response.

The air monitoring and purifying device 830 sends a request for acquiring <action 1> to the service layer 820, and after receiving the request, the service layer 820 sends information of the action 1 to the air monitoring and purifying device 830, i.e., feeds back a response, responding to the request for acquiring <action 1>, to the air monitoring and purifying device 830.

After receiving the response responding to the request for acquiring <action 1>, the air monitoring and purifying device 830 modifies the action 2 according to the action 1 to acquire a new action 2, so as to solve the problem that the action 1 conflicts with the action 2. The air monitoring and purifying device 830 then sends a new request for creating a new <action 2> to the service layer 820, a target of the new action 2 is the controller for controlling the door and/or the window. There is no conflict between the new action 2 and the action 1, thus eliminating the gap between different products.

An air conditioning device 840 sends a request for creating <action 3> to the service layer 820, and since the action 3 conflicts with the action 1 and the action 2, the service layer 820 sends a failure response, responding to the request for creating <action 3>, to the air conditioning device 840. A target of the action 3 is the controller for controlling the door and/or the window.

The service layer 820 sends a request for recommending to acquire <action 1> and <action 2> to the air conditioning device 840, i.e., recommends the air conditioning device 840 to execute actions of acquiring the action 1 and the action 2 so as to check the action 1 and the action 2. The air conditioning device 840 determines to accept the recommendation of the service layer 820 based on the request for recommending to acquire <action 1> and <action 2>, and sends a response, responding to the recommendation of acquiring <action 1> and <action 2>, to the service layer 820, and the service layer 820 determines that the air conditioning device 840 has agreed with the recommendation based on the response.

The air conditioning device 840 sends a request for acquiring <action 1> and <action 2> to the service layer 820, and after receiving the request, the service layer 820 sends information of the action 1 and the action 2 to the air conditioning device 840, i.e., feeds back a response, responding to the request for acquiring <action 1> <action 2>, to the air conditioning device 840.

After receiving the response responding to the request for acquiring <action 1> and <action 2>, the air conditioning device 840 modifies the action 3 based on the action 1 and the action 2 to acquire a new action 3 to solve the problem that the action 3 conflicts with the action 1 and the action 2. The air conditioning device 840 then sends a request for creating a new <action 3> to the service layer 820, a target of the new action 3 is the controller for controlling the door and/or the window. The new action 3 does not conflict with the action 1 and the action 2, thus eliminating the gap between different products.

In FIG. 16, the service layer 820 may be the first requester, the air monitoring and purifying device 830 and the air conditioning device 840 may be regarded as the first receiver, and when the actions, to be created, requested by the air monitoring and purifying device 830 and the air conditioning device 840 conflict with the action that has been created, the actions, to be created, requested by the air monitoring and purifying device 830 and the air conditioning device 840 and the action that has been created are for the same object for controlling, the service layer 820 sends the recommendation information to the air monitoring and purifying device 830 and the air conditioning device 840 so that the air monitoring and purifying device 830 and the air conditioning device 840 modify the actions according to the recommendation information.

In FIG. 17, the service layer 820 feeds back the response indicating that the action 2 has been created successfully to the air monitoring and purifying device 830. Then, the service layer 820 sends a request for recommending to acquire <action 2> to the gas monitoring device 810, i.e., recommends the gas monitoring device 810 to acquire the action 2 so as to check the action 2. The gas monitoring device 810 determines to accept the recommendation of the service layer 820 according to the request for recommending to acquire <action 2>, and sends a response, responding to the recommendation of acquiring <action 2>, to the service layer 820, and the service layer 820 determines that the gas monitoring device 810 has agreed with the recommendation according to the response.

The gas monitoring device 810 sends a request for acquiring <action 2> to the service layer 820, and after receiving the request, the service layer 820 sends information of the action 2 to the gas monitoring device 810, i.e., feeds back a response, responding to the request for acquiring <action 2>, to the gas monitoring device 810.

After receiving the response responding to the request for acquiring <action 2>, the gas monitoring device 810 modifies the action 1 according to the action 2 to acquire a new action 1, so as to solve the problem that the action 1 conflicts with the action 2. The gas monitoring device 810 then sends a new request for creating a new <action 1> to the service layer 820, a target of the new action 1 is the controller for controlling the door and/or the window. There is no conflict between the new action 1 and the action 2, and thus the gap between different products is eliminated.

In FIG. 17, the gas monitoring device 810 may be the first receiver, the service layer 820 may be the first requester, and after the first receiver requests to create the action, when the action, to be created, requested by another device conflicts with the action that has been created by the first receiver, the first requester sends a recommendation, for checking the action, to be created, requested by another device, to the first receiver to make a reverse recommendation to the first receiver, so that the first receiver modifies its own action, and re-requests to create a new action.

In FIG. 18, after a failure response indicating that the creation of the action 2 fails is feedback to the air monitoring and purifying device 830 from the service layer 820, the service layer 820 recommends a request for creating a new <action 2> to the air monitoring and purifying device 830, that is, the service layer 820 sends a recommendation with a creation result to the air monitoring and purifying device 830.

After receiving the recommended request, the air monitoring and purifying device 830 reconstructs a request for creating a new action 2 for the controller for controlling the door and/or the window according to the recommended request, and sends the request to the service layer 820. The service layer 820 creates the new action 2 according to the acquired request for creating the new <action 2> and feeds back a response responding to the request for creating the new <action 2> to the air monitoring and purifying device 830. Thus, the air monitoring and purifying device 830 requests to create the new action 2 based on the recommendation with the creation result received from the service layer 820, so that the new action 2 does not conflict with the action 1.

In FIG. 18, the air monitoring and purifying device 830 may be the first receiver, the service layer 820 may be the first requester, and for the same object for controlling, i.e., the controller for controlling the door and/or the window, the first requester may recommend a new action to the first receiver when the action, to be created, requested by the first receiver conflicts with the action created by the service layer 820 according to the request of another device.

Figure 19:
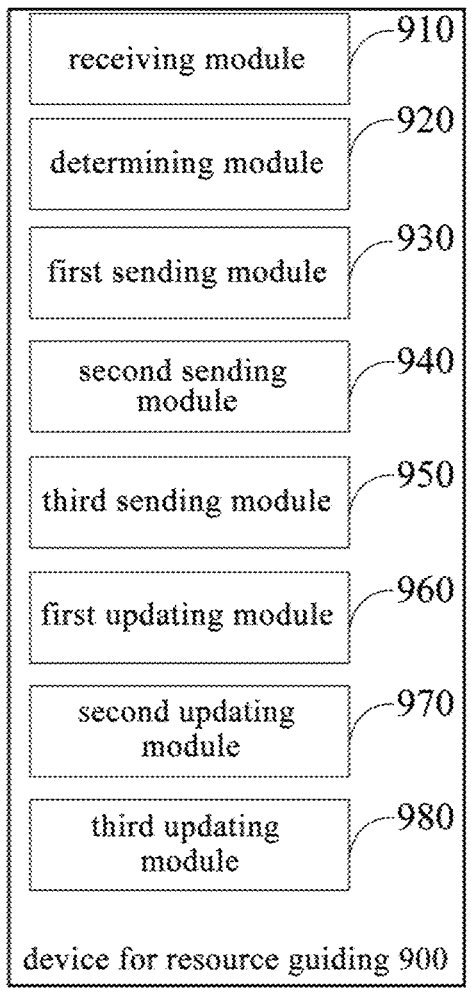
FIG. 19 is a schematic structural diagram of a device for resource guiding according to an embodiment of the present application.

In order to implement the foregoing embodiments, an embodiment of the present application further provides a device for resource guiding. FIG. 19 is a schematic structural diagram of a device for resource guiding according to an embodiment of the present application.

The device for resource guiding in the embodiment of the present application may be applied to the first receiver.

As shown in FIG. 19, the device 900 for resource guiding includes: a receiving module 910 and a determining module 920.

The receiving module 910 is configured to acquire a target request sent by a first requester, the target request carries resource information and a target address, the target address includes a virtual resource address, and the resource information includes recommendation information.

The determining module 920 is configured to acquire the recommendation information according to the virtual resource address, and determine an action executor according to the virtual resource address; the recommendation information is used for recommending a next action to be executed for the action executor.

In some implementations, the target request is an update request, the recommendation information is information of a first target group, the information of the first target group includes an identifier of the first target group and a member list of the first target group, the member list of the first target group includes an identifier of the first receiver, the recommendation information is used for recommending, for an action executor, to execute an action of joining the first target group.

The determining module 920 is configured to analyze the target address, and determine that the action executor is the first receiver, according to the virtual resource address,
the device 900 for resource guiding may further include:
a first sending module 930 configured to send a first response to the first requester according to the recommendation information, so that the first requester determines whether the first receiver executes the action of joining the first target group, according to whether the member list of the first target group in the first response includes an identifier of the first receiver.

In some implementations, the member list of the first target group in the first response includes the identifier of the first receiver,
the first sending module 930 is further configured to send an update request to the first requester, the update request includes the identifier of the first receiver,
the receiving module 910 is further configured to receive a corresponding response sent by the first requester.

In some implementations, the target request is a create request, the recommendation information in the create request includes an identifier of each member in the second target group, the recommendation information is used to recommend, for the action executor, to execute an action for creating a second target group.

The determining module 920 is configured to analyze the target address, and determine that the action executor is a first action executor according to the virtual resource address,
the device 900 for resource guiding further includes:
a second sending module 940 configured to forward the target request to the first action executor;
the receiving module 910 is configured to acquire a second response from the first action executor;
the second sending module 940 is further configured to send the second response to the first requester, so that the first requester determines whether the second target group has been created successfully, according to the information, about whether the second target group has been created successfully, in the second response.

In some implementations, the device 900 for resource guiding may further include:
a third sending module 950 configured to send a request, for creating an action resource for the object for controlling, to the first requester, the request for creating the action resource includes information of the first action resource;
the receiving module 910 is further configured to acquire a third response, responding to the request for creating the action resource, from the first requester.

In some implementations, the third response is a failure response, the failure response is generated by the first requester when the first action resource conflicts with the created second action resource, the target request is an information acquisition request, i.e., a request for acquiring information, the recommendation information in the information acquisition request is information of the second action resource, the recommendation information is used for recommending, for the action executor, to execute an action for acquiring the information of the second action resource,
the determining module 920 is configured to analyze the target address, and determine that the action executor is the first receiver, according to the virtual resource address;
the third sending module 950 is further configured to send a fourth response to the first requester according to the information of the second action resource.

In some implementations, the third sending module 950 is further configured to send a first acquisition request to the first requester;
the receiving module 910 is further configured to receive a response, corresponding to the first acquisition request, sent by the first requester, the response corresponding to the first acquisition request includes information of the second action resource;
the device 900 for resource guiding further includes:
a first updating module 960 configured to update the first action resource according to the information of the second action resource;
the third sending module 950 is further configured to send an updated request for creating an action resource to the first requester, the updated request for creating the action resource includes information of the updated first action resource.

In some implementations, the third response is a failure response, the failure response is generated by the first requester when the first action resource conflicts with the created second action resource, the target request is a create request, the recommendation information in the create request is information of a new first action resource, the recommendation information is used for recommending, for the action executor, to execute an action for creating the new first action resource,
the determining module 920 is configured to analyze the target address, and determine that the action executor is the first receiver, according to the virtual resource address;
the third sending module 950 is further configured to send a fifth response to the first requester according to the information of the new first action resource.

In some implementations, the device 900 for resource guiding may further include a second updating module 970 configured to update the first action resource according to the information of the new first action resource carried by the create request;
the third sending module 950 is further configured to send an updated request for creating an action resource to the first requester, the updated request for creating the action resource includes information of the updated first action resource.

In some implementations, the third response is a successful response, the target request is an information acquisition request, i.e., a request for acquiring information, the recommendation information in the information acquisition request is information of a third action resource, the third action resource is created, for the object for controlling, by the first requester, after the first action resource is created, the recommendation information is used for recommending, for the action executor, to execute the action of acquiring the information of the third action resource, the determining module 920 is configured to analyze the target address, and determine that the action executor is the first receiver, according to the virtual resource address;

the third sending module 950 is further configured to send a sixth response to the first requester according to the information of the third action resource.

In some implementations, the third sending module 950 is further configured to send a second acquisition request to the first requester;

the receiving module 910 is further configured to receive a response, corresponding to the second acquisition request, sent by the first requester, the response corresponding to the second acquisition request includes information of the third action resource;

the device 900 for resource guiding may further include:

a third updating module 980 configured to update the first action resource according to the information of the third action resource, and send an updated request for creating an action resource to the first requester, the updated request for creating the action resource includes information of the updated first action resource.

It should be noted that the foregoing explanation of the method for resource guiding is also applicable to the device for resource guiding in the embodiment, and therefore is not described herein again.

According to the device for resource guiding in the embodiment of the present application, by setting the virtual resource address, the action executor is determined according to the virtual resource address, and the next action to be executed is recommended to the action executor according to the recommendation information, so that the resource is guided through the virtual resource address, the interaction efficiency and the interaction intelligence are improved, and the time delay is reduced.

Figure 20:
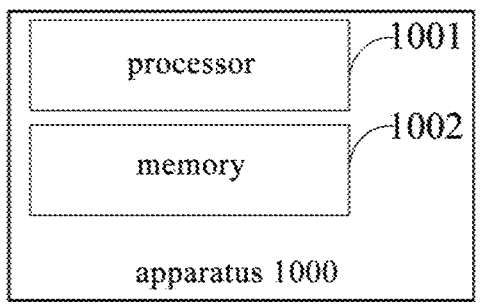
FIG. 20 is a schematic structural diagram of an apparatus according to an embodiment of the present application.

In order to implement the foregoing embodiments, an apparatus is further proposed in an embodiment of the present application, as shown in FIG. 20, the apparatus 1000 includes a processor 1001 and a memory 1002.

The processor 1001 runs a program corresponding to an executable program code stored in the memory 1002 by reading the executable program code, so as to implement the method for resource guiding according to the above-described embodiments.

Figure 21:
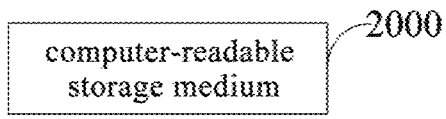
FIG. 21 is a schematic diagram of a computer-readable storage medium according to an embodiment of the present application.

In order to implement the foregoing embodiments, the present application further provides a non-transitory computer-readable storage medium, as shown in FIG. 21, the computer-readable storage medium 2000 stores thereon a computer program which, when executed by a processor, implements the method for resource guiding according to the foregoing embodiments.

In the description of the present application, the terms "first" and "second" are only used for descriptive purposes and cannot be understood as indicating or implying relative importance or implicitly indicating the number of indicated technical features. Thus, the features defined with "first" and "second" can include at least one of the features explicitly or implicitly.

While the embodiments of the present application have been shown and described above, it should be understood that the above embodiments are exemplary and cannot be understood as restrictions on the present application. Those skilled in the art may change, vary, replace and modify features of the above embodiments within the scope of the present application.

The invention claimed is:

1. A method for resource guiding, comprising:

acquiring, by a first receiver, a target request sent by a first requester, wherein the target request carries resource information and a target address, the target address comprises a virtual resource address, and the resource information comprises recommendation information; and acquiring, by the first receiver, the recommendation information according to the virtual resource address, and determining an action executor according to the virtual resource address, wherein the recommendation information is used for recommending, for the action executor, a next action to be executed, wherein the target request is an update request, the recommendation information is information of a first target group, the information of the first target group comprises an identifier of the first target group and a member list of the first target group, the member list of the first target group comprises an identifier of the first receiver, the recommendation information is used for recommending, for the action executor, to execute an action of joining the first target group, and determining the action executor according to the virtual resource address comprises:

analyzing, by the first receiver, the target address, and determining that the action executor is the first receiver, according to the virtual resource address;

the method further comprises:

after determining the action executor according to the virtual resource address, sending, by the first receiver, a first response to the first requester according to the recommendation information, the first requester determines whether the first receiver executes the action of joining the first target group, according to whether the member list of the first target group in the first response contains the identifier of the first receiver, and wherein the member list of the first target group in the first response comprises an identifier of the first receiver, the method further comprises:

after sending the first response to the first requester according to the recommendation information, sending, by the first receiver, an update request to the first requester, wherein the update request comprises the identifier of the first receiver; and receiving, by the first receiver, a corresponding response sent by the first requester.

2. An apparatus, comprising a processor and a memory; the processor executes a program, corresponding to an executable program code stored in the memory, by reading the executable program code to implement the method according to claim 1.

3. A non-transitory computer-readable storage medium having stored thereon a computer program which, when executed by a processor, implements the method of claim 1.

4. A method for resource guiding, comprising:
acquiring, by a first receiver, a target request sent by a first requester, wherein the target request carries resource information and a target address, the target address comprises a virtual resource address, and the resource information comprises recommendation information; and acquiring, by the first receiver, the recommendation information according to the virtual resource address, and determining an action executor according to the virtual resource address, wherein the recommendation information is used for recommending, for the action executor, a next action to be executed, wherein the method, further comprising:
before acquiring the target request sent by the first requester, sending, by the first receiver, a request, for creating an action resource for an object for controlling, to the first requester, wherein the request for creating the action resource comprises information of a first action resource; and acquiring, by the first receiver, a third response, responding to the request for creating the action resource, from the first requester, and wherein the third response is a failure response, the failure response is generated by the first requester when the first action resource conflicts with a created second action resource, the target request is an information acquisition request, the recommendation information in the information acquisition request is information of the second action resource, the recommendation information is used for recommending, for the action executor, to execute an action for acquiring the information of the second action resource, and determining the action executor according to the virtual resource address comprises: analyzing, by the first receiver, the target address, and determining that the action executor is the first receiver, according to the virtual resource address; and the method further comprises: after determining that the action executor is the first receiver, sending, by the first receiver, a fourth response to the first requester according to the information of the second action resource, or, the target request is a create request, and the recommendation information in the create request is information of a new first action resource, the recommendation information is used for recommending, for the action executor, to execute an action for creating the new first action resource, and determining the action executor according to the virtual resource address comprises: analyzing, by the first receiver, the target address, and determining that the action executor is the first receiver, according to the virtual resource address; and the method further comprises: after determining that the action executor is the first receiver, sending, by the first receiver, a fifth response to the first requester according to the information of the new first action resource.

5. The method of claim 4, further comprising:
after sending the fourth response to the first requester according to the information of the second action resource, sending, by the first receiver, a first acquisition request to the first requester;

receiving, by the first receiver, a response corresponding to the first acquisition request sent by the first requester, wherein the response corresponding to the first acquisition request comprises the information of the second action resource; and updating, by the first receiver, the first action resource according to the information of the second action resource, and sending an updated request for creating an action resource to the first requester, wherein the updated request for creating the action resource comprises information of the updated first action resource.

6. The method of claim 4, further comprising:
after sending the fifth response to the first requester according to the information of the new first action resource, updating, by the first receiver, the first action resource according to the information of the new first action resource carried in the create request; and sending, by the first receiver, an updated request for creating an action resource to the first requester, wherein the updated request for creating the action resource comprises the information of the updated first action resource.

7. An apparatus, comprising a processor and a memory;
the processor executes a program, corresponding to an executable program code stored in the memory, by reading the executable program code to implement the method according to claim 4.

8. A non-transitory computer-readable storage medium having stored thereon a computer program which, when executed by a processor, implements the method of claim 4.

9. A method for resource guiding, comprising:
acquiring, by a first receiver, a target request sent by a first requester, wherein the target request carries resource information and a target address, the target address comprises a virtual resource address, and the resource information comprises recommendation information; and acquiring, by the first receiver, the recommendation information according to the virtual resource address, and determining an action executor according to the virtual resource address, wherein the recommendation information is used for recommending, for the action executor, a next action to be executed, wherein the method further comprising:
before acquiring the target request sent by the first requester, sending, by the first receiver, a request, for creating an action resource for a object for controlling, to the first requester, wherein the request for creating the action resource comprises information of a first action resource; and acquiring, by the first receiver, a third response, responding to the request for creating the action resource, from the first requester, and wherein wherein the third response is a successful response, the target request is an information acquisition request, the recommendation information in the information acquisition request is information of a third action resource, the third action resource is created by the first requester for the object for controlling after the first action resource is created, the recommendation information is used for recommending, for the action executor, to execute an action for acquiring the information of the third action resource, and determining the action executor according to the virtual resource address comprises:

analyzing, by the first receiver, the target address, and determining that the action executor is the first receiver, according to the virtual resource address;

the method further comprises:

after determining that the action executor is the first receiver, sending, by the first receiver, a sixth response to the first requester according to the information of the third action resource.

10. The method of claim 9, further comprising:

after sending the sixth response to the first requester according to the information of the third action resource, sending, by the first receiver, a second acquisition request to the first requester;

receiving, by the first receiver, a response corresponding to the second acquisition request sent by the first requester, wherein the response corresponding to the second acquisition request comprises the information of the third action resource; and updating, by the first receiver, the first action resource according to the information of the third action resource, and sending an updated request for creating an action resource to the first requester, wherein the updated request for creating the action resource comprises information of the updated first action resource.

11. An apparatus, comprising a processor and a memory;

the processor executes a program, corresponding to an executable program code stored in the memory, by reading the executable program code to implement the method according to claim 9.

12. A non-transitory computer-readable storage medium having stored thereon a computer program which, when executed by a processor, implements the method of claim 9.

\* \* \* \* \*